(12) United States Patent
Kurath-Grollmann

(10) Patent No.: US 12,031,315 B2
(45) Date of Patent: Jul. 9, 2024

(54) CONCRETE CEILING, CONCRETE CEILING ELEMENTS AND METHOD FOR PRODUCING A CONCRETE CEILING AND A CONCRETE CEILING ELEMENT

(71) Applicant: CPC AG, Andelfingen (CH)

(72) Inventor: Josef Peter Kurath-Grollmann, Winterthur (CH)

(73) Assignee: CPC AG, Andelfingen (CH)

( * ) Notice: Subject to any disclaimer, the term of this patent is extended or adjusted under 35 U.S.C. 154(b) by 0 days.

(21) Appl. No.: 17/640,292

(22) PCT Filed: Sep. 6, 2019

(86) PCT No.: PCT/EP2019/073887
§ 371 (c)(1),
(2) Date: Mar. 3, 2022

(87) PCT Pub. No.: WO2021/043428
PCT Pub. Date: Mar. 11, 2021

(65) Prior Publication Data
US 2022/0341151 A1  Oct. 27, 2022

(51) Int. Cl.
*E04B 1/06* (2006.01)
*E04B 5/04* (2006.01)

(52) U.S. Cl.
CPC . *E04B 1/06* (2013.01); *E04B 5/04* (2013.01)

(58) Field of Classification Search
CPC . E04B 9/00; E04B 9/04; E04B 9/0421; E04B 2103/02; E04B 1/06; E04B 5/04
See application file for complete search history.

(56) References Cited

U.S. PATENT DOCUMENTS

| | | | | |
|---|---|---|---|---|
| 1,484,206 A | * | 2/1924 | Birkholz | E04C 2/044 |
| | | | | 52/285.2 |
| 2,039,183 A | * | 4/1936 | Nagel | E04B 7/20 |
| | | | | 52/630 |
| 2,047,109 A | * | 7/1936 | Nagel | E04C 2/044 |
| | | | | 52/327 |
| RE22,569 E | * | 11/1944 | Abeles | E04B 5/23 |
| | | | | 52/223.8 |

(Continued)

FOREIGN PATENT DOCUMENTS

| | | |
|---|---|---|
| CA | 2777124 A1 | 11/2013 |
| CN | 102535710 A | 7/2012 |

(Continued)

OTHER PUBLICATIONS

International Search Report for corresponding PCT application No. PCT/EP2019/073887, mailed May 14, 2020.

(Continued)

*Primary Examiner* — Gisele D Ford
(74) *Attorney, Agent, or Firm* — Notaro, Michalos & Zaccaria P.C.

(57) ABSTRACT

A concrete ceiling element for producing a concrete ceiling is disclosed. The concrete ceiling element has a flat basic structure that has an upper side and at least one FRC plate. The concrete ceiling element has at least one FRC ridge. The FRC ridge is arranged on the upper side and connected in sections to the basic structure. Furthermore, a concrete ceiling and a method for producing a concrete ceiling or a concrete ceiling element are provided.

54 Claims, 14 Drawing Sheets

(56) References Cited

U.S. PATENT DOCUMENTS

| | | | | |
|---|---|---|---|---|
| 2,769,332 | A * | 11/1956 | Brown, Jr. | E04B 2/30 52/270 |
| 3,475,529 | A * | 10/1969 | Lacy | B28B 23/046 52/223.6 |
| 3,546,830 | A * | 12/1970 | Jean-Charles | E04B 5/48 52/100 |
| 3,707,819 | A * | 1/1973 | Calhoun | E04B 5/04 52/319 |
| 3,841,206 | A * | 10/1974 | Meckler | E04B 5/23 362/147 |
| 4,096,068 | A * | 6/1978 | Walker | B01D 24/14 210/293 |
| 4,387,544 | A * | 6/1983 | Schilger | E04C 3/293 52/600 |
| 4,555,888 | A * | 12/1985 | Goldenberg | E04C 2/40 52/223.7 |
| 4,640,854 | A * | 2/1987 | Radtke | E04F 15/185 428/179 |
| 4,702,048 | A * | 10/1987 | Millman | E04B 5/48 404/34 |
| 4,989,382 | A * | 2/1991 | Spronken | E04H 13/006 52/134 |
| 5,946,872 | A * | 9/1999 | Pardo | E04B 5/08 52/437 |
| 5,950,390 | A * | 9/1999 | Jones | E04B 1/04 52/319 |
| 6,101,779 | A * | 8/2000 | Davenport | E04B 1/04 52/223.6 |
| 7,937,901 | B2 * | 5/2011 | Sarkkinen | E04G 11/46 52/223.6 |
| 8,943,771 | B2 * | 2/2015 | Garcia | E04B 5/14 52/33 |
| 8,973,318 | B2 * | 3/2015 | Hammond | E01B 1/002 52/223.7 |
| 9,388,562 | B2 * | 7/2016 | Thomas | E04B 1/04 |
| 10,239,228 | B2 * | 3/2019 | Hertz | B28B 19/003 |
| 10,619,347 | B2 * | 4/2020 | Pilz | E04C 3/04 |
| 11,536,017 | B2 * | 12/2022 | VanHoose | E03F 5/10 |
| 2003/0126817 | A1 * | 7/2003 | Gleeson | A61L 15/58 52/471 |
| 2003/0126822 | A1 * | 7/2003 | Gleeson | E04F 13/0889 52/604 |
| 2004/0211139 | A1 * | 10/2004 | Peng | E04C 2/044 52/746.1 |
| 2013/0160385 | A1 * | 6/2013 | Alarcon Garcia | E04B 5/48 52/340 |
| 2015/0267408 | A1 * | 9/2015 | Kurath-Grollmann | E04B 5/32 52/223.13 |
| 2016/0129607 | A1 * | 5/2016 | Hertz | B28B 1/16 52/600 |
| 2016/0290030 | A1 * | 10/2016 | Collins | E06B 3/46 |
| 2017/0268242 | A1 * | 9/2017 | Molinelli | E04G 11/46 |
| 2017/0299198 | A1 * | 10/2017 | Collins | E04C 2/50 |
| 2019/0127979 | A1 * | 5/2019 | Park | C04B 40/0039 |

FOREIGN PATENT DOCUMENTS

| | | |
|---|---|---|
| DE | 202015104966 U1 | 11/2016 |
| EP | 2589719 A1 | 5/2013 |
| JP | H0328153 A | 2/1991 |
| JP | H04272352 A | 9/1992 |
| JP | 2005510382 A | 4/2005 |
| JP | 2015110860 A | 6/2015 |
| JP | 2017082581 A | 5/2017 |
| WO | 03045687 A1 | 6/2003 |
| WO | 03046100 A1 | 6/2003 |
| WO | 2008051923 A2 | 5/2008 |
| WO | 2011155841 A1 | 12/2011 |
| WO | 2013145726 A1 | 10/2013 |
| WO | 2014040653 A1 | 3/2014 |

OTHER PUBLICATIONS

Aug. 29, 2023 European Patent Office Examination Report with machine translation.

* cited by examiner

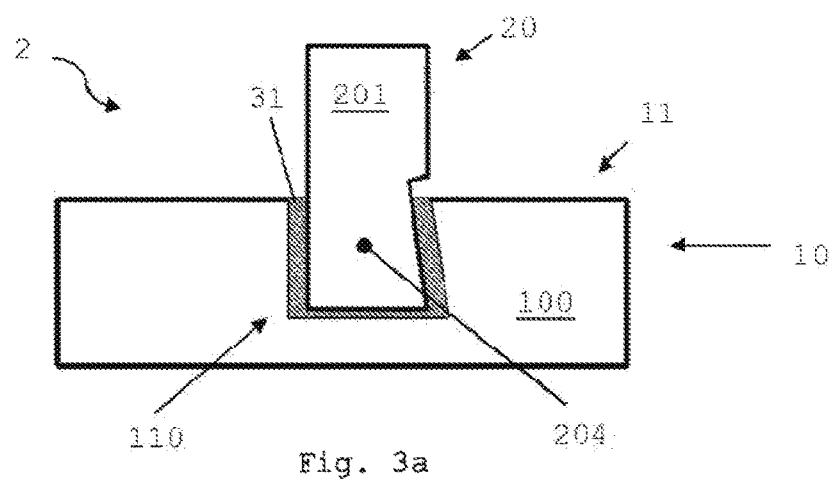
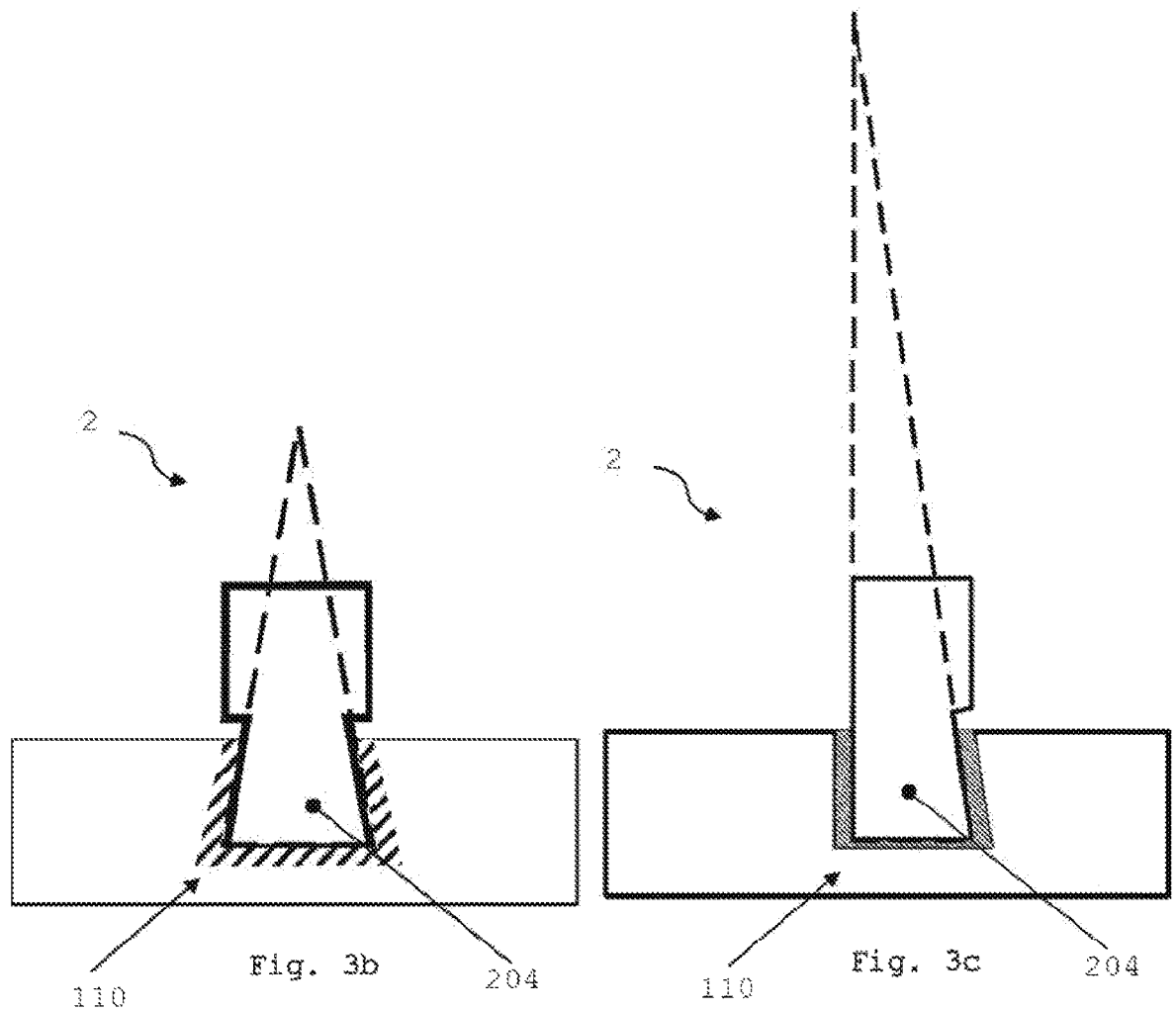

CONCRETE CEILING, CONCRETE CEILING ELEMENTS AND METHOD FOR PRODUCING A CONCRETE CEILING AND A CONCRETE CEILING ELEMENT

TECHNICAL FIELD

The present invention relates, inter alia, to a concrete ceiling, concrete ceiling elements and methods for producing a concrete ceiling and for producing a concrete ceiling element.

BACKGROUND

The classic reinforced concrete ceiling, which, due to the steel reinforcement, can absorb high compressive forces as well as high tensile forces and is therefore particularly stable, is widespread in building construction. Such a reinforced concrete ceiling is usually built by first arranging formwork panels flat on the already standing building walls and supporting them with the help of supports. Spacers are then placed on the plane formed by the formwork panels, on which in turn a first steel grid is arranged. Usually another layer of spacers follows on the first steel grid, on which in turn another steel grid is arranged. Lines, such as pipes for underfloor heating or cable ducts, must then be laid in the structure made of steel grids before everything can be poured with concrete to form the later reinforced concrete ceiling. As already mentioned, this ceiling is particularly stable, but also requires a large amount of raw materials, especially concrete, and has a high dead weight. Subsequent adjustments, such as laying new lines, are difficult and the initial production of such a reinforced concrete ceiling on site at the construction site does not always run smoothly due to a certain dependence on the given weather conditions. Frost, great heat or heavy rainfall can affect the setting process of the concrete and thus have an influence on the quality of the reinforced concrete ceiling, which means that weather conditions must be taken into account when producing it.

SUMMARY

The object of the present document is to provide a concrete ceiling which overcomes at least one disadvantage of reinforced concrete ceilings known from the prior art. Aspects of this document relate to concrete ceiling elements for producing a concrete ceiling, methods for producing a concrete ceiling and concrete ceilings as such. Further aspects of this document relate to the use of FRC concrete elements and the use of special connection techniques for FRC elements.

The object is achieved by a concrete ceiling element according to claim 1.

Said concrete ceiling element comprises a flat basic structure which comprises at least one FRC-plate and has an upper side. The concrete ceiling element further comprises at least one FRC ridge. The FRC ridge is arranged on the upper side and connected in sections to the basic structure.

The letters "FRC" in FRC-plates and FRC ridges stand for "Fiber Reinforced Concrete". FRC-plates are described, inter alia, in WO2014/040653 A1, the content of which is to be understood as part of the disclosure of the present application. FRC-plates are pre-tensioned with fibers, e.g. made of carbon, glass, Kevlar, basalt, steel, natural fiber or the like, the cross-sectional area of which is, for example, less than 5 mm$^2$ and have a thickness of a few centimeters (e.g. 1 cm to 10 cm). The width and length, in turn, range from a few meters (1 m, 2 m, ..., 5 m etc.) to 10 m or even 20 m up to 40 m. The reinforcement of the plates can be based on different distances and arrangements of the fibers with respect to one another. Further details can be found in WO2014/040653 A1. Since the fibers used have a very high tensile strength and preferably do not corrode, particularly stable, thin concrete plates can be produced with them. The reinforcement overlap of three to four centimeters required with conventional reinforced concrete plates is no longer necessary. In comparison, FRC plates are therefore significantly thinner and lower in weight—and with the same load-bearing capacity. A special embodiment of an FRC-plate is the CPC-plate. The letters "CPC" stand for "carbon prestressed concrete" and describe the concrete plates reinforced with thin, pre-stressed carbon strands, which can be used according to at least some embodiments and are particularly filigree and yet resilient. What is special about the CPC-plates is that, thanks to the pre-tensioning by means of the fibers, they remain extremely stiff even under pure tensile load and free from cracks under load. This is an advantage especially when used as a basic structure. When used as a slab, they can withstand extremely high shear forces with high rigidity without cracking.

Typical FRC-plates used for concrete ceiling elements are between 10 and 100 mm, in particular between 20 and 60 mm, e.g. 25 mm or 30 mm, in particular 40 mm with regard to fire protection, thick and have, for example, a 4-layer CFRP reinforcement. As far as the dimension is concerned, the FRC-plates can have lengths and widths of several meters. For example 1 m×2 m, 2 m×2 m, 2 m×4 m up to 20 m×40 m. A maximum width of 2.4 m is preferred, since problem-free road transport is still possible. However, a width of up to 3.5 m or even up to 6 m is conceivable if the difficult transport conditions are accepted. The length of the FRC-plates is preferably given by the floor space of the rooms to be spanned or the dimensions of the building and is typically in the range of approx. 4 m or 5 m up to 12 m or even 20 m. The bottom side and the top side of an FRC-plate are usually designed identically, so that only the attachment of the FRC ridge or several FRC ridges determines which side will act as the upper side in the further course of the construction of the concrete ceiling.

The FRC ridges are also made of FRC and are preferably cut from FRC-plates. In connection with at least some embodiments, a ridge describes an elongated structure which can be attached to the basic structure like a type of rib or lamella, but does not have to be connected to the basic structure along its entire length. An FRC ridge preferably has a thickness of 2 cm to 10 cm, in particular 4 cm to 8 cm, such as 6 cm, which thickness extends constantly or varying over the entire length and width of the FRC ridge. The length of the ridge is, for example, adapted to the length or width of the FRC-plate and is thus typically in the range of several meters, for example between 1 m to 20 m or even up to 40 m. The height of an FRC ridge respectively the supports varies, among other things also depending on the longitudinal dimension of the room to be spanned under the concrete ceiling element, and is usually in the range of one tenth to one thirtieth of the room to be spanned by the ceiling. In particular, it is the distance between two adjacent support points that, divided by 10 to 30, results in the height of the FRC ridges. However, for design reasons the height of the ridges can also be higher, e.g. if lines have to be routed at the height as the ceiling element or adjoining rooms have significantly larger support spacings and the ceiling element thickness is to be kept constant over the entire ceiling. For a 2.4 m wide and 6 m long FRC-plate, the support points of which are in the corners, the result is a calculated FRC ridge height of 8 cm to 24 cm or 20 cm to 60 cm. Since the maximum distance between two support points is decisive for the dimensioning of the FRC ridges, these are manufactured with a height of 20 cm to 60 cm. If the FRC ridges are used crosswise, it may be advisable to set the same height for the transverse and longitudinal CPC ridges.

As the name "concrete ceiling element" suggests, such a concrete ceiling element can be used to produce a concrete ceiling. However, this designation is in no way to be understood as restriction. For example, it is also possible to use such a concrete ceiling element to produce a bridge, in particular a trough bridge.

In an embodiment of the concrete ceiling element, which can be combined with any of the embodiments yet to be mentioned, if not contradicting this, the FRC ridge has at least two supports which provide the connection to the basic structure in sections.

As far as the connection of the FRC ridge to the basic structure via the supports is concerned, this connection is preferably force-fit and occurs, for example, via one or more extensions per support. These extensions preferably not only adjoin the upper side of the basic structure, but engage with the basic structure.

In an embodiment of the concrete ceiling element, which can be combined with any of the embodiments to be mentioned and already mentioned, provided that it does not contradict this, there is a recess between the at least two supports.

Such a ridge is composed of areas, the supports, which are provided in order to come at least partially into contact, in particular with a force-fit and with the aid of extensions, with the basic structure, and areas, the recesses, which are provided in order not to come into contact with, and above all not frictional into contact, with the basic structure. These recesses in particular provide a free space or a passage. Ridges with arch-shaped recesses, in particular with semi-circular recesses, are particularly stable and also uncomplicated to produce, but other recess shapes can basically also be realized, such as oval, triangular, rectangular or other polygonal shapes. The height of the recess can be between approx. 1% to approx. 80% compared to the height of the FRC ridge or the supports of the FRC ridge, which has already been discussed. With an FRC ridge height of e.g. 20 cm, the height of the recess can be only 2 mm or up to 16 cm. However, it is preferred that the recess is only so large that a minimum material thickness of 4 cm to 20 cm, depending on the load and span of the intended ceiling, remains between the supports. The opening length of the recess in the support area of the concrete ceiling elements is approximately 0.5 to twice the height of the ridges and in particular at least 10 cm or even at least 20 cm or at least 30 cm. In the middle range of the span length, the opening length of the recess can also be a multiple of the height of the ridges. In principle, recesses in an FRC ridge can have different sizes (applies to both the opening length and the opening height) and, in particular, be larger in the middle of the FRC ridge than in the region of the ends. Depending on the planned application, ridges with just one recess and two supports can be used, or ridges with a plurality of n recesses (e.g. 2, 3, 4, 5, 6, 7, 8, 9, 10, 11, 12, 13), 14, 15, 16, 17, 18, 19, 20, . . . ) and a plurality of m supports, where the number of supports is, for example, n, n+1, or n−1. For the sake of stability, ridges with an m=n+1 configuration are recommended, since the ridge can then be supported at both ends with the corresponding supports on the basic structure and thus indirectly on the supports.

In an embodiment of the concrete ceiling element, which can be combined with any of the embodiments to be mentioned and already mentioned, unless contradicting them, the FRC ridges are either aligned parallel to one another or at an angle of less than 180° and greater than 0°, in particular at an angle of 90°, i.e. orthogonally or at right angles, aligned to each other. If the concrete ceiling element comprises more than two FRC ridges, some of the FRC ridges can be arranged parallel to one another, while another part of the FRC ridges is arranged with respect to the first-mentioned part is at an angle of less than 180° and greater than 0°, in particular at an angle of 90°.

In the case of a concrete ceiling to be created at right angles, the use of a number of longitudinal FRC ridges arranged parallel to one another and a number of transverse FRC ridges arranged parallel to one another are most suitable, with the transversal FRC ridges being aligned orthogonally to the longitudinal FRC ridges. In the case of more unusual basic ceiling shapes, such as hexagonal, in the shape of a parallelogram or trapezoidally-shaped, it can be advantageous for the stability of the concrete ceiling, to use for example longitudinal FRC ridges being arranged parallel relative to each other and with respect to one side of the parallelogram and transversal FRC ridges being arranged parallel to another side of the parallelogram, with cutting angles of the longitudinal and transversal FRC ridges of, for example, 60°, 70°, 75°, 80° or 85° being accomplished. In the case of a trapezoidal shape, on the other hand, it may be advisable to only align the set of longitudinal FRC ridges with each other and parallel to the two parallel sides of the trapezoid, and again not to arrange the transversal FRC ridges parallel, but at an acute angle to each other, so that a different cutting angle with the longitudinal FRC bars is accomplished. In the case of a basic hexagonal concrete ceiling form, for example, an FRC ridge arrangement comparable to a spider web can be used. The arrangement can also refer explicitly to the support situation, e.g. the ceiling is rectangular, but the support points are arranged in a trapezoid. Then it may be advantageous to let the ridges run over the ceiling bearers, i.e. supports, or parallel to the support situation.

Nonetheless, an orthogonal arrangement of the longitudinal and transversal FRC ridges is likely to be the most used, but the FRC ridges will not always be aligned parallel to the ceiling edges.

In an embodiment of the concrete ceiling element, which can be combined with any of the embodiments to be mentioned and already mentioned, if not contradicting them, at least some of the FRC ridges arranged parallel to one another are also arranged equidistant from one another.

In principle, it can be assumed that the more even the arrangement of the FRC ridges, the more likely it is that the concrete ceiling will have the same stability at all points. An equidistant arrangement in turn contributes to a uniform arrangement. Typical distances between FRC ridges arranged in parallel are in the order of magnitude of 20 cm or even 50 cm to 200 cm or even 300 cm.

In an embodiment of the concrete ceiling element, which can be combined with any of the embodiments yet to be mentioned and already mentioned, if not contradicting them, at least some of the FRC ridges arranged parallel to one another are not arranged equidistant from one another.

In terms of statics, such an arrangement may be preferred over an equidistant arrangement and does not have any disadvantage in terms of use. In particular, if several concrete ceiling elements have to be strung together to span a room, a non-equidistant arrangement can result. For example, if two FRC-plates with a width of 2.4 m, each with two FRC ridges at a distance of 1.6 m from one another and at a distance of 0.4 m from the edge of the FRC-plate, are arranged next to one another.

In an embodiment of the concrete ceiling element, which can be combined with any of the embodiments to be mentioned and already mentioned, if not contradicting them, part of the FRC ridges arranged parallel to one another is not equidistant from another part of the FRC ridges arranged parallel to one another, such that at least one area of higher FRC-ridge-density is formed.

A higher FRC ridge density, i.e. more FRC ridges per unit area of the upper side of the basic structure, ensures a local reinforcement of the concrete ceiling element. This is advantageous, for example, to reinforce the concrete ceiling element in those areas that are particularly stressed in the production process of the concrete ceiling due to the laying or supporting of the concrete ceiling element on building side walls or ceiling supports. Such narrower distances can be in the range of half to a quarter of the usual distances, for example 5 cm or 10 cm to 75 cm or 150 cm, in particular 30 cm.

In an embodiment of the concrete ceiling element, which can be combined with any of the embodiments to be mentioned and already mentioned, unless contradicting them, at least two of the FRC ridges are at an angle of less than 180° and greater than 0°, in particular orthogonal, arranged to each other such that the at least two FRC ridges intersect at an intersection. At this point of intersection, the at least two FRC ridges are plugged into one another or one on top of the other.

On the one hand, the plug-in connection enables the alignment of the FRC ridges to be fixed to one another and, on the other hand, ensures the attachment, or at least contributes to the fastening, of the FRC ridge plugged onto or into, provided the other FRC ridge is already otherwise connected to the basic structure. Furthermore, the plug-in connection can ensure that the FRC ridges form a flat support surface on the upper side of the basic structure, for example for parquet boards or the like to be attached in the further course.

In an embodiment of the concrete ceiling element, which can be combined with any of the embodiments to be mentioned and already mentioned, if not contradicting them, at least one of the two FRC ridges has a groove at the point of intersection.

In particular, only the further FRC ridge to be arranged at an angle to an existing FRC ridge can have a groove in order to be plugged onto the already existing FRC ridge. The upper edge of the further FRC ridge arranged later would then be higher up than that of the existing FRC ridge.

In an embodiment of the concrete ceiling element, which can be combined with any of the embodiments to be mentioned and already mentioned, provided that it does not contradict this, the at least two of the FRC ridges each have an opposing groove at the point of intersection.

If one takes a closer look at the two FRC ridges at their point of intersection, then one FRC ridge has a groove that is open upwards and the other FRC ridge has a groove that is open in the opposite direction, that is to say downwards. In order for the interlocking to work, the groove of one FRC ridge must be at least as wide as the width of the other FRC ridge, and vice versa. In order for the process of plugging not to be unnecessarily complicated, the grooves are usually designed a little more liberal and thus ensure a certain amount of clearance. As a consequence, instead of a contact area, an empty space is formed around the FRC ridges at the point of intersection. In order to now also be able to form a flat support surface, the depth of the two grooves in total corresponds to at least the height of the FRC ridges, which have an identical height, at the point of intersection.

So that the FRC ridges are also able to withstand large longitudinal compressive forces, e.g. the upwardly open grooves can be provided with a filling material (e.g. mortar) in order to compensate for the inaccuracy of the grooves, i.e. the clearance described above and the resulting empty space.

In an embodiment of the concrete ceiling element, which can be combined with any of the embodiments to be mentioned and already mentioned, if not contradicting this, an FRC ridge, or a fragment of an FRC ridge composed of several fragments, is at an angle less than 180° and greater than 0°, in particular orthogonally, arranged between at least two other FRC ridges and connected to them.

The connection of the one FRC ridge or the fragment of one such with the other two transversal FRC ridges can be made, for example, with the aid of a binding agent such as mortar or adhesive. With such, the distances between the ends of the one FRC ridge or of the FRC ridge fragment and the respectively adjoining two other FRC ridges can be filled at least partially. Alternatively, the fragment or the FRC ridge can be conically shaped and thus inserted or clamped between the two other FRC ridges. A clamp connection can also be provided, for example, by driving a wedge or the like into the clearance.

In an embodiment of the concrete ceiling element, which can be combined with any of the embodiments to be mentioned and already mentioned, provided that this does not contradict, at least three, in particular at least four, of the FRC ridges are arranged to one another in such a way that they enclose a space, which is at least partially filled with concrete.

By pouring out one or more such spaces, the concrete ceiling element can be selectively reinforced, for example at certain points, but also over a larger area.

In an embodiment of the concrete ceiling element, which can be combined with any of the embodiments to be mentioned and already mentioned, unless contradicting them, at least one of the FRC ridges is solid and/or at least one of the FRC ridges has a cavity.

The individual design of the FRC ridges offers the possibility of optimally adapting the concrete ceiling element to the stability requirements of the concrete ceiling built on it. In a simpler embodiment, for example, all FRC ridges are of identical design and are solid. In a more specific embodiment, on the other hand, some or all of the number of FRC ridges each with one or more cavities, for example in the form of a slot, can be specifically designed. Upper tensile reinforcements can then be placed in these cavities. To ensure their connection with the FRC ridges, the cavities are filled with e.g. mortar or adhesive. The use of upper tensile reinforcements with the help of the cavities is particularly useful above slab props or walls. Tension elements such as a tension rod or steel reinforcements or textile reinforcement (e.g. based on glass, carbon, aramid, basalt, . . . ) can be used as upper tensile reinforcement. A cavity is, for example, 10 mm to 30 mm wide. In the case of stronger, i.e. thicker, ridges, it can also be wider, for example up to a ridge width minus 20 mm. A cavity is, for example, 40 mm to 100 mm or even up to 150 mm deep.

In an embodiment of the concrete ceiling element, which can be combined with any of the embodiments to be mentioned and already mentioned, provided that this is not in contradiction, the basic structure comprises at least two FRC ridges arranged flatly next to one another and adjacent to one another.

Depending on the size of the planned concrete ceiling but also depending on the conditions on the construction site, such as the transport routes there, etc., it can be advantageous to deliver the FRC-plates and FRC ridges separately and then to produce precisely fitting concrete ceiling elements on site, the basic structure of which requires more than one FRC-plate. For example, if the concrete ceiling is to cover an area of 8 m×8 m, but only FRC-plates with a surface area of 2 m×8 m can be delivered to the construction site without special transport, a total of four concrete ceiling elements with four FRC-plates in the basic structure each can be used on site for this concrete ceiling. But also in the event that concrete ceiling elements are required in special sizes, these can simply be put together from several FRC-plates fabricated in a standard size and even cut to size.

In an embodiment of the concrete ceiling element, which can be combined with any of the embodiments to be mentioned and already mentioned, provided that there is no contradiction, the FRC-plates are at least partially glued along their mutually aligned sides.

In order to be able to provide a stable basic structure which comprises more than one FRC-plate, the FRC-plates can be connected to one another. Gluing in particular, e.g. based on a binding agent such as mortar, glue, etc., is a possible connection technique.

In an embodiment of the concrete ceiling element, which can be combined with any of the embodiments to be mentioned and already mentioned, provided that there is no contradiction, at least one connecting element is at least partially attached on the upper side along the aligned sides of the flatly arranged next to one another FRC-plates that are and adjacent to one another.

In order to achieve a particularly stable basic structure, a connection element in the form of a tensile connection can be installed along the aligned sides of the FRC-plates, which are arranged next to each other and adjacent to each other, e.g. by means of a connection patch (e.g. lamella made of fiber composite plastic (FRCK), carbon fiber plastic (CFRP), or e.g. steel or FRP (Fiber Reinforced Plastic) panel strips), which is glued on from the top.

In an embodiment of the concrete ceiling element, which can be combined with any of the embodiments to be mentioned and already mentioned, if there is no contradiction, at least one support has an extension at the end and facing the upper side. At the same time, an FRC-plate of the basic structure has a recess that is larger than the extension. Correspondingly, the extension and recess are not dimensioned for a form fit. The extension is arranged in the recess and fixed therein.

The fixation can be carried out, for example, with the aid of a filling material. A suitable filling material is, for example, a binding agent such as an adhesive or mortar, but also, for example, sand. In addition, a fixation can be achieved, for example, by attaching a lock, for example in the form of a (e.g. wedge-shaped) board, which is driven into the recess from above and reduces this in such a way that the extension is "wedged" in it. Depending on the fixation method chosen, it can be advantageous to at least partially roughen the outside of the extension in order to enable better adhesion of the filling material and in particular of the binding agent. In principle, the extension can have a wide variety of shapes in cross-section, such as rectangular, round or oval. The number of extensions per support and their design can also vary. For example, an extension can be arranged on each support or only on every second or third support, which, for example, extends over the entire longitudinal dimension of one support, but only part of the longitudinal dimension of another support. However, several, e.g. two, three, four, etc., shorter extensions can be present on a support, which are arranged lengthwise next to one another. The recesses of the FRC-plate(s) or the basic structure are accordingly either arranged in a complementary manner or implemented in the form of a continuous groove.

The resulting connection, here called a plug-and-fit connection, since the extension is inserted into the recess on the one hand and fitted into it by the filling material, combines two concepts. On the one hand, two parts are wedged into one another with a longitudinal movement, so that the FRC-plates can be subjected to transverse tension. On the other hand, a toothing is joined in the transverse direction to the FRC-plates, so that very large longitudinal forces can be absorbed with the connection. Since the plug-and-fit connection of the concrete ceiling element is not based on a form fit at the beginning, but rather the extension and the recess have a certain amount of clearance, the tolerances in their formation can be relatively large, which simplifies production. In order to still achieve a strong connection in the form of wedging, a filling material is introduced into the recess, which balances or compensates for the clearance, e.g. by pouring in a binding agent (e.g. hydraulically bound mortar), pouring in sand as a filling material or driving in a wedge or a platelet, whereby the wedge or the platelet can be viewed as a filling material. This means that there is no need to use screws or organic glue for the connection between the FRC ridge and the FRC-plate.

Since it is easier in terms of production to equip the supports of the FRC ridges with corresponding extensions and the FRC-plates with corresponding recesses, the exemplary embodiments primarily address this embodiment. However, it is also easily possible to implement the plug-and-fit connection of these two elements vice versa, i.e. by providing the FRC-plate with extensions and the FRC ridge with recesses (possibly implemented in the form of a continuous groove). The recesses can then—instead of the extensions—be arranged in accordance with the arrangement pattern for extensions already described. It is also possible to combine these two variants, i.e. to design FRC-plates with extensions and recesses and FRC ridges with extensions and recesses in order to realize the plug-and-fit connection.

In an embodiment of the concrete ceiling element, which can be combined with any of the embodiments to be mentioned and already mentioned, provided that there is no contradiction, the extension and the recess have the shape of a wedge in cross-section.

The wedge defining the shape can be a wedge with one inclined plane or with two inclined planes. Due to the geometry of the extension, i.e. the wedge shape, it jams in the recess in the event of a transversal tensile load. The fixation of the extension in the recess is preferably carried out with the help of a filling material, such as a binding agent (e.g. mortar, adhesive, . . . ) or a sand in order to realize the plug-and-fit connection. In this version, the plug-and-fit connection is particularly strong and can absorb very high longitudinal forces and also transversal tensile forces.

In an embodiment of the concrete ceiling element, which can be combined with any of the embodiments to be mentioned and already mentioned, if there is no contradiction, the dimension of the recess and the dimension of the extension are coordinated in such a way that the extension can be introduced into the recess from above, in particular in that the recess is made larger at its narrowest point than the extension at its widest point.

In this embodiment, the extension and the recess are produced with so much clearance that they can be joined together like a tooth system in the transverse direction, that is to say the extension can be introduced into the recess from the top. So that they can no longer loosen transversely and can even absorb forces in this direction, the gap between the extension and recess is, as already described, cast or jammed with mortar, adhesive, sand, wedge, plate or another filler material.

In an embodiment of the concrete ceiling element, which can be combined with any of the embodiments to be mentioned and already mentioned, if there is no contradiction, both the extension and the recess have the shape of a wedge with only one inclined plane in cross section.

Surprisingly, it is not necessary for both the recess and the extension to have the shape of a wedge with two inclined planes in cross section; in fact the advantageous characteristics, such as the absorbance of high longitudinal forces and transversal tensile forces, too, already appear in the presence of a cross section having the shape of a wedge with only one inclined plane, which in turn involves an easier production.

One aspect of the present document relates to a concrete ceiling which comprises at least one previously described concrete ceiling element.

In addition to the serious weight savings in comparison to a conventional reinforced concrete ceiling, considerable resources can also be saved based on the concrete ceiling elements according to at least some embodiments. Although the savings primarily relate to the ceiling in and of itself, they also have an effect on the structures that support the ceiling. If the ceiling becomes lighter, the walls and load-bearing columns can also be made less massive. Another advantage of a construction based on the concrete ceiling elements described is that a large part of the work can be carried out in a workshop and the construction site work is significantly shortened and also made much less weather-dependent. Nevertheless, it is possible to build large ceilings, which are much larger than the individual elements to be transported on a truck (e.g. concrete ceiling elements or FRC-plates). The on-site assembled basic structure carries in several directions and ultimately only has to stand on three or four ceiling supports after the ceiling production process, for example.

In an embodiment of the concrete ceiling, which can be combined with any of the embodiments to be mentioned, if there is no contradiction, it comprises at least one line which is arranged on the upper side of the basic structure and is guided through at least one recess of an FRC ridge.

With conventional reinforced concrete ceilings, the lines are poured into concrete, so that subsequent laying of lines is associated with immense effort. The concrete ceiling elements according to at least some embodiments, however, make it possible to guide the lines through the recesses, for example in the form of arches, of the FRC ridges and make the setting in concrete superfluous. This means that lines can be laid simply and easily even after the concrete ceiling has been completed, e.g. in the course of a renovation. Since cables do not have to be laid in every ceiling, this is of course an optional feature.

In an embodiment of the concrete ceiling, which can be combined with any of the embodiments to be mentioned and already mentioned, provided that there is no contradiction, the concrete ceiling comprises a cover layer supported on the FRC ridges. Such a cover layer can include, for example, floor slabs made of wood (e.g. parquet), stone (e.g. roof terrace slabs), ceramic (e.g. tiles), and/or FRC concrete.

Because the cover layer is supported on the FRC ridges, access to the entire ceiling structure, in particular the concrete ceiling elements and any lines laid therein, is guaranteed from above. This makes renovation and maintenance work particularly straightforward.

Another aspect of the present document relates to the use of a plug-and-fit connection for connecting two FRC concrete elements.

As already described, the plug-and-fit connection is based on an extension, preferably having the shape of a wedge in cross section, and a recess, preferably having the shape of a wedge in cross section, into which the extension is introduced and fixed therein. The fixation takes place in particular with the aid of a filling material. One of the FRC concrete elements has the extension, the other FRC concrete element in turn has the recess.

Yet another aspect of the present document relates to a method for producing a concrete ceiling and comprises providing at least one concrete ceiling element. Furthermore, the method optionally comprises arranging at least one line on the upper side of the basic structure and guiding this line through at least one recess in an FRC ridge and/or supporting a cover layer on the FRC ridges.

In an embodiment of the method, which can be combined with any of the embodiments to be mentioned and already mentioned, if there is no contradiction, the method comprises providing at least two concrete ceiling elements and arranging the at least two concrete ceiling elements flat next to one another. Optionally, in particular subsequently, the method can include gluing the at least two concrete ceiling elements at least partially along their mutually aligned sides. Also optionally as a supplement or alternative, the method can include attaching at least one connecting element on the upper side, at least partially along the mutually aligned sides of the concrete ceiling elements arranged flatly next to each other and adjacent to each other.

In an embodiment of the method, which can be combined with each of the embodiments to be mentioned and already mentioned, if there is no contradiction, the method comprises arranging at least one additional FRC ridge on the upper side of the basic structure.

The arrangement takes place, for example, at an angle of less than 180° and greater than 0° to the at least one existing FRC ridge of the at least one concrete ceiling element.

The arrangement includes, for example, plugging the at least one additional FRC ridge onto the at least one existing FRC ridge.

One aspect of the present document relates to a further method for producing a concrete ceiling and comprises providing at least one FRC-plate for forming a basic structure. The method further optionally comprises arranging at least one line on the top of the basic structure and arranging at least one FRC ridge on the top of the basic structure. In addition, the method includes supporting a cover layer on the FRC ridges. In particular, the steps are carried out in the order given above.

The at least one FRC-plate preferably has recesses, the cross section of which is wedge-shaped. The at least one line is preferably arranged in such a way that the recesses remain free. The at least one FRC ridge is preferably arranged by introducing an extension of the supports of the FRC ridges, which is wedge-shaped in cross section, into a recess and fixing the extension in the recess with the aid of a filling material.

In an embodiment of the method, which can be combined with any of the embodiments to be mentioned and already mentioned, if there is no contradiction, the method comprises arranging at least one further FRC ridge on the upper side of the basic structure.

The arrangement takes place in particular at an angle of less than 180° and greater than 0° to the already arranged at least one FRC ridge and/or includes in particular plugging the at least one additional FRC ridge onto the at least one already arranged FRC ridge.

In an embodiment of the method, which can be combined with each of the embodiments to be mentioned and already mentioned, provided that there is no contradiction, the method comprises providing at least two FRC-plates to form a basic structure and arranging the at least two FRC-plates flat next to one another. Optionally, the method further comprises, in particular, gluing the at least two FRC-plates at least partially along their mutually aligned sides. Also optionally, as a substitute for or in addition to the step just described, the method comprises in particular attaching at least one connecting element on the top at least partially along the mutually aligned sides of the FRC-plates arranged flatly next to one another and adjacent to one another. The at least two FRC-plates preferably have recesses that are wedge-shaped in cross section.

A further aspect of the present document relates to a method for producing a concrete ceiling element and comprises providing at least one FRC-plate for forming a basic structure and arranging at least one FRC ridge on the upper side of the basic structure.

The method optionally includes arranging at least one further FRC ridge on the upper side of the basic structure, preferably at an angle of less than 180° and greater than 0° to the already arranged at least one FRC ridge, and/or preferably includes plugging the at least an additional FRC ridge on the at least one already arranged FRC ridge.

The at least two FRC-plates preferably have recesses that are wedge-shaped in cross section. At least one FRC ridge is arranged in particular by introducing an extension of the supports of the FRC ridge, which is wedge-shaped in cross section, into a recess and fixing the extension in the recess with the aid of a filling material.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Other advantages and features, which are to be understood not to be limiting, will become apparent from the following detailed description with reference to the drawings. It shows FIG. 1a a schematic longitudinal section through a known concrete ceiling;

FIG. 3a a schematic cross section through an embodiment of a concrete ceiling element according to the present disclosure;

FIG. 3b a schematic cross section through an embodiment of a concrete ceiling element according to the present disclosure;

FIG. 3c a schematic cross section through an embodiment of a concrete ceiling element according to the present disclosure;

DETAILED DESCRIPTION OF THE DRAWINGS

Figure 1A:
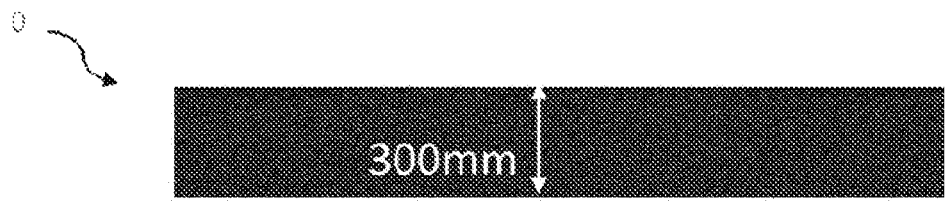
FIG. 1b a schematic longitudinal section through a concrete ceiling according to the present disclosure.

A longitudinal section through a known concrete ceiling 0 without a cover layer is shown schematically in FIG. 1a. The concrete ceiling 0 is approx. 300 mm thick and massive. Such a concrete ceiling 0 has a payload of 2 kN/m², a permanent load of 2 kN/m² and a dead load of 7.5 kN/m². This results in a total of 11.5 kN/m².

Figure 1B:
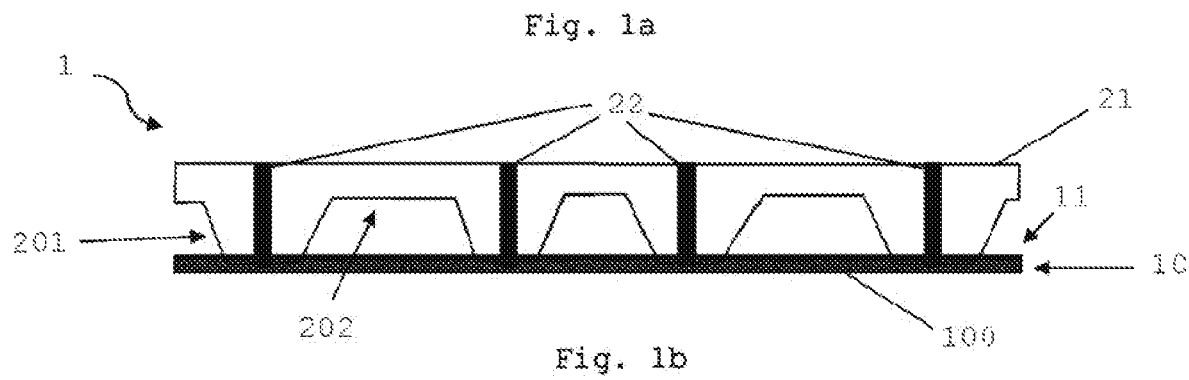

A longitudinal section through a concrete ceiling 1 according to at least some embodiments without a cover layer is shown schematically in FIG. 1b. The concrete ceiling in this example has the same area as the usual concrete ceiling shown in FIGS. 1a and 1s also about 300 mm thick, but not solid. Rather, the concrete ceiling 1 is composed of several FRC-plates 100, which form a basic structure 10. On the upper side 11 of this basic structure 10, and thus the FRC-plates 100, arranged and connected to these are longitudinal FRC ridges 21 and transversal FRC ridges 22. The longitudinal FRC ridge 21, through which the longitudinal section runs, has three recesses 202 in total and four supports 201 (for the sake of clarity, only one recess and one support are provided with reference symbols). It is the supports 201 which provide the connection between the basic structure 10 and the ridge 20. The concrete ceiling 1 shown further comprises four transversal FRC ridges 22, which are essentially aligned orthogonally to the longitudinal FRC ridges 21 and intersect them, in particular at the level of the supports 201 of the longitudinal FRC ridges 21. Such a concrete ceiling according to at least some embodiments has a payload of 2 kN/m$^2$, a permanent load of 2 kN/m$^2$ and a dead load of 1.8 kN/m$^2$. This results in a total of 5.8 kN/m$^2$. If one now compares the usual concrete ceiling from FIG. 1a with the concrete ceiling according to FIG. 1b, it quickly becomes clear which enormous advantages the concrete ceiling according to the present disclosure offers. With the same load-bearing capacity, this comes with a fraction of its own weight and thus offers the possibility of building much lighter with the same stability and this with an enormous potential for savings in material.

Figure 2A:
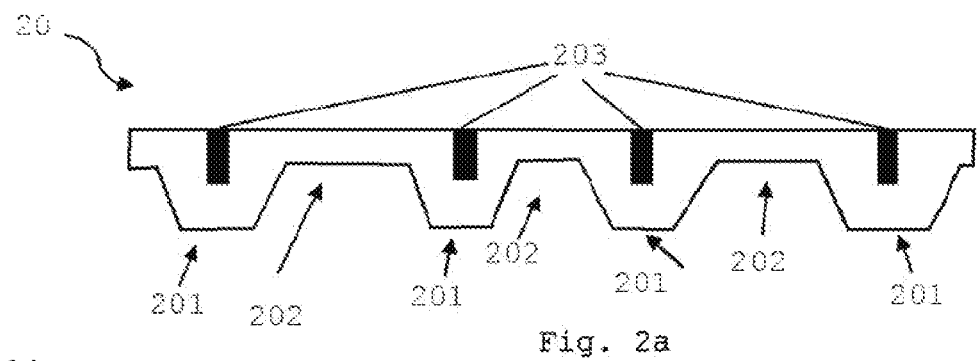
FIG. 2a a schematic longitudinal section through an embodiment of an FRC ridge.

A longitudinal section through an FRC ridge 20, which has three recesses 202 and four supports 201, is shown schematically in FIG. 2a. This FRC ridge shall, for example, be a longitudinal FRC ridge in the final construction. In order to be able to accommodate further FRC ridges running orthogonally to this shown FRC ridge 20, the shown FRC ridge 20 has grooves 203 at the level of the supports 201 in order to be able to accommodate an orthogonally aligned FRC ridge therein according to the plug-and-fit principle. The grooves 203 are located in the upper area of the supports 201 and thus represent openings pointing away from the upper side of the basic structure.

Figure 2B:
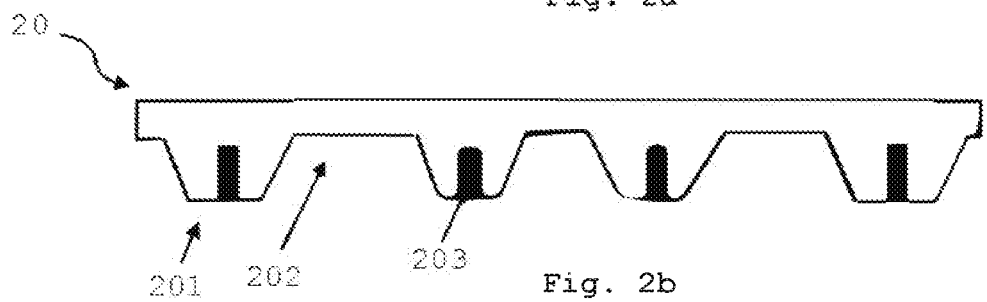
FIG. 2b a schematic longitudinal section through a further embodiment of an FRC ridge.

In FIG. 2b, a longitudinal section through an FRC web ridge is shown schematically, which has three recesses 202 and four supports 201 (for the sake of clarity, only one recess and one support are provided with reference symbols). This FRC ridge 20 is intended to be, for example, a transversal FRC ridge in the final construction. In order to be able to be connected according to the plug-and-fit principle with a longitudinal FRC ridge, as shown for example in FIG. 2a, the FRC ridge 20 has grooves 203 in the supports which are matched to the grooves of the longitudinal FRC ridges that the longitudinal and transversal FRC ridges define a flat surface and arranged on the top of the basic structure have one and the same height (for the sake of clarity, only one of the grooves is provided with a reference number). The grooves 203 are located in the lower area of the supports 201 and thus represent openings pointing towards the upper side of the basic structure.

Figure 2C:
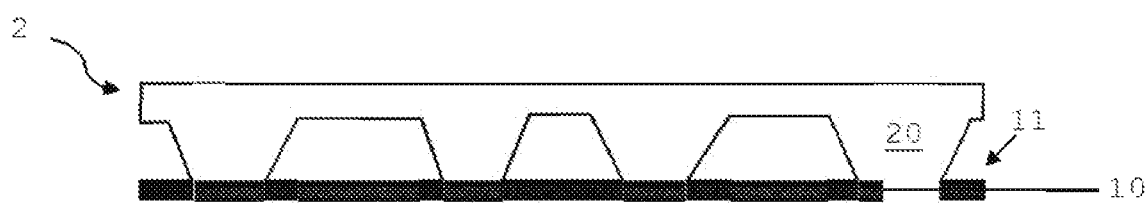
FIG. 2c a schematic longitudinal section through a concrete ceiling element according to the present disclosure.

FIG. 2c shows a schematic longitudinal section through a concrete ceiling element 2 with exclusively parallel FRC ridges 20 attached to the upper side 11 of the basic structure 10. The FRC ridges 20 can be formed without a groove, since they do not have to accommodate other transversal FRC ridges.

FIG. 3a shows a schematic cross section through an embodiment of a concrete ceiling element 2 according to at least some embodiments. A plug-and-fit connection is shown between an FRC-plate 100, which provides the basic structure 10 with the top 11, and an FRC ridge 20. The cross section runs through the support 201 of the FRC ridge 20, which has an extension 204 in the form of a wedge with only one inclined plane. The FRC-plate 100 in turn has a recess 110 also in the form of a wedge with only one inclined plane. The recess 110 is designed to be sufficiently large so that the extension 204 can be placed in the recess 110 from the top 11. Accordingly, the connection is—for the time being—not a form-fitting connection. In order that a positive fit nonetheless occurs, the cavity between the recess 110 and the extension 204 is at least partially or completely filled with a filling material 31, such as mortar, sand or the like, and thus wedged.

FIG. 3b shows a schematic cross section through an embodiment of a concrete ceiling element 2 according to at least some embodiments. In contrast to the embodiment of FIG. 3a, the extension 204 and the recess 110 are modelled on the shape of a wedge with two inclined planes. The wedge that inspires this shape is shown in a dashed line.

FIG. 3c shows the same cross section through the concrete ceiling element 2 as FIG. 3a, but the wedge with only one inclined plane is shown in dashed lines, on the shape of which the extension 204 of the support and the recess 110 are oriented.

Figure 3D:
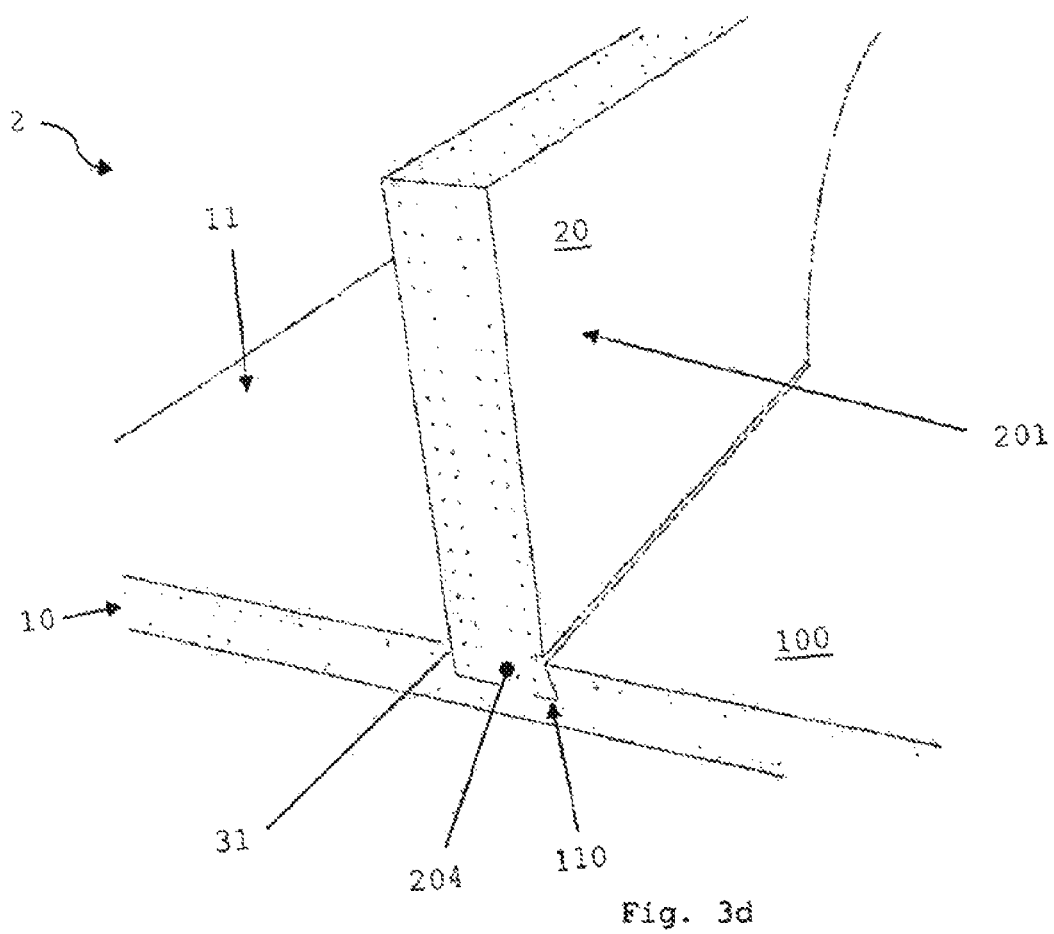
FIG. 3d a perspective top view of an embodiment of a concrete ceiling element according to the present disclosure.

FIG. 3d shows a perspective top view of an embodiment of a concrete ceiling element 2 according to at least some embodiments. As in FIG. 3a, also in FIG. 3b a plug-and-fit connection between an FRC-plate 100, which provides the basic structure 10 with an upper side 11, and an FRC ridge 20 is shown. The extension 204 of the support 201 of the FRC ridge 20 is let into an elongated recess 110 in the FRC-plate 100, which is part of the basic structure 10 with the surface 11. The elongated recess 110 and the elongated extension 204 both have a cross section in the form of a wedge with only one inclined plane and are connected to one another by a filling material 31.

Figure 4:
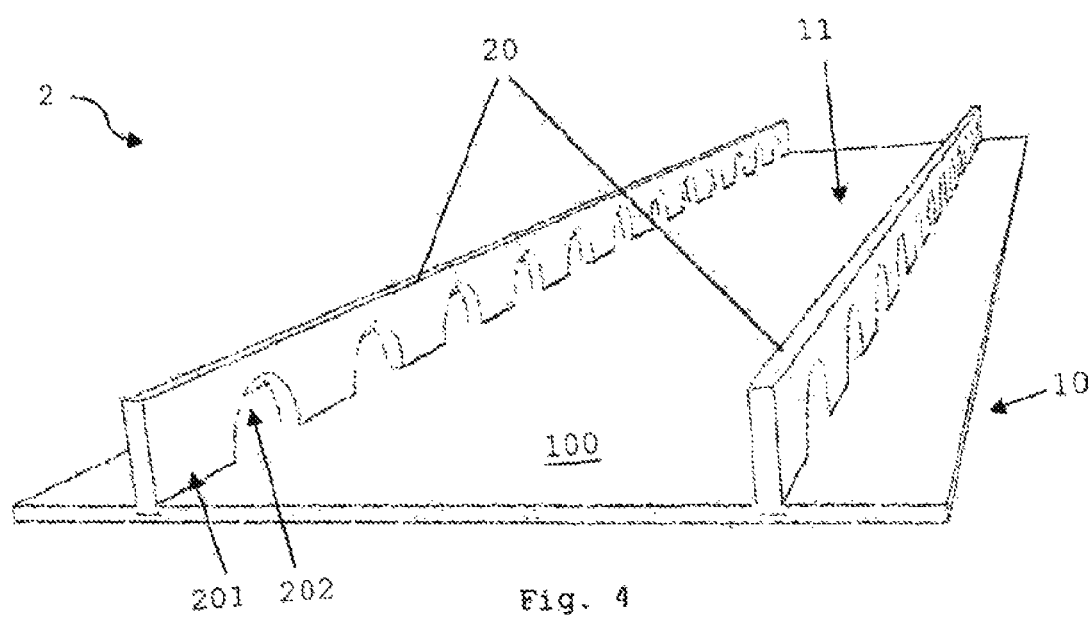
FIG. 4 a perspective top view of an embodiment of a concrete ceiling element according to the present disclosure.

FIG. 4 shows a perspective top view of an embodiment of a concrete ceiling element 2 according to at least some embodiments. Its basic structure 10 consists of an FRC-plate 100, on the upper side of which, which upper side is identical to the upper side 11 of the basic structure 10, two FRC ridges 20 are arranged. These FRC ridges 20 are aligned parallel to one another and constructed identically to one another. Each FRC ridge 20 has twelve arcuate recesses 202 and thirteen supports 201 (for the sake of clarity, only one recess 202 and one support 201 for one of the two FRC ridges 20 are provided with reference symbols). Such a concrete ceiling element 2 can be used to produce a concrete ceiling, the FRC panel 100 serving as lower sheating and tension flange and the FRC ridges 20 acting as a compression flange.

The FRC-plate 100 of the basic structure 10 and the FRC-plate(s) (not shown) from which the FRC ridges 20 are cut have been prestressed, for example, only in the longitudinal direction or in the longitudinal and transverse directions. Usually neither the longitudinally tensioned with the transversely tensioned fibers nor the longitudinally tensioned fibers or the transversely tensioned fibers are connected to one another. The fibers for longitudinal tensioning and the fibers for transverse tensioning can be arranged in several layers. Tensioning is carried out with fibers (e.g. made of carbon, glass, Kevlar, basalt, steel, natural fibers etc.), whereby the term "fiber" includes both a single or several elongated and flexible reinforcement elements, e.g. single filaments, multifilaments, fiber bundles (e.g. stranded or twisted), wires, or one or more rovings (typically comprising 2000 to approx. 16000 filaments). The net cross-sectional area of the fibers (i.e. without resin impregnation)

is e.g. less than approx. 5 mm² and in particular lies in a range from approx. 0.1 mm² to approx. 1 mm². The tensile strength of the fibers in relation to their net cross-sectional area is, for example, greater than approx. 1000 N/mm², in particular greater than approx. 1800 N/mm². The elastic tensile strength of the fibers is, for example, greater than approx. 1%. In one example, the fibers, in particular carbon fibers, can be tensioned with a tension of approx. 50% to approx. 95%, in particular of at least approx. 80%, in particular at least approx. 90%, of the tensile breaking strength of the fibers. For example, the reinforcement distance (=distance between two adjacent fibers) is approx. 5 mm to approx. 40 mm, in particular approx. 8 mm to approx. 25 mm, and/or the FRC-plate comprises at least 10, in particular at least 40, fibers. For example, the reinforcement spacing is less than or equal to twice the height of the FRC-plate. The reinforcement content of an FRC-plate is, for example, more than 20 mm²/m width. For example, a tension of at least approx. 30 kN/m or at least approx. 300 kN/m is generated during prestressing, depending on the load requirements on the FRC-plate (dimensioning force).

Figure 5:
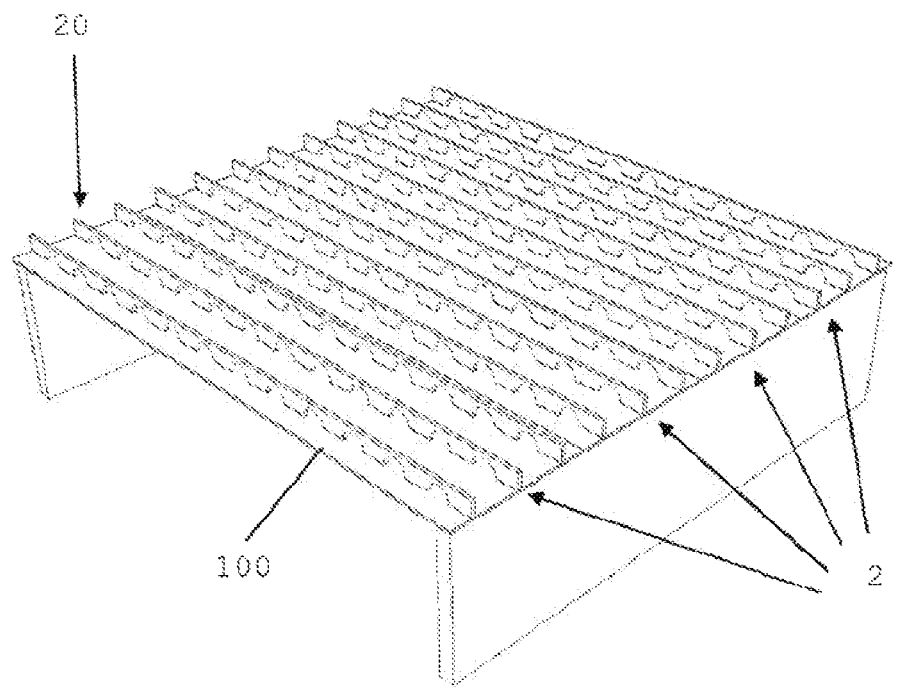
FIG. 5 a perspective top view of several concrete ceiling elements of an embodiment according to the present disclosure arranged next to one another.

FIG. 5 shows a perspective top view of four concrete ceiling elements 2 of the same embodiment arranged next to one another. Each concrete ceiling element 2 has three mutually parallel and identically designed FRC ridges 20 which extend along the entire length of the respective FRC-plate 100 on which they are arranged and terminate flush with one of their supports. The total of four FRC-plates 100 are arranged flush and each end supported on a side wall. On the adjoining sides, mutually adjacent FRC-plates 100 are connected to one another. In the example shown here, a binding agent is applied along the contact surface of the adjoining sides of the FRC-plates 100 (not shown in the figure). The three FRC ridges 20 are each arranged on the FRC-plates 100 in such a way that placing several FRC-plates 100 next to one another results in a large FRC-plate with equidistant and parallel arranged FRC ridges 20.

Figure 6A:
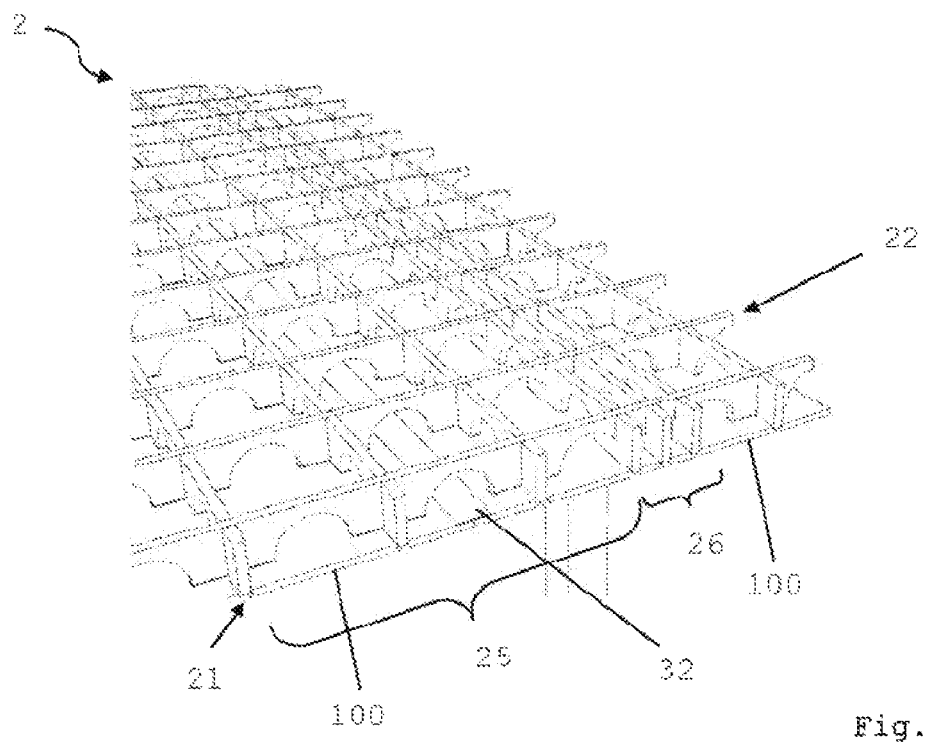
FIG. 6a a perspective top view of an embodiment of a concrete ceiling element according to the present disclosure resting on ceiling supports.

FIG. 6a shows a perspective top view of an embodiment of a concrete ceiling element 2 according to at least some embodiments, which rests on ceiling supports (in the section shown, a ceiling support can be seen at the front right). The concrete ceiling element 2 has both longitudinal FRC ridges 21 and transverse FRC ridges 22. The longitudinal FRC ridges 21 end flush with the FRC-plate 100 with a support, while the transverse FRC ridges 22 end with a recess flush with the FRC-plate 100. The transverse FRC ridges 22 are arranged equidistant from one another, while the longitudinal FRC ridges 21 have an area 25 with an equidistant but wider arrangement and an area 26 with an equidistant but narrower arrangement. In the example shown, the area 26 of the narrower FRC ridge arrangement provides for a longitudinal reinforcement over the ceiling supports. On the adjoining sides, adjacent FRC-plates 100 are connected to one another by gluing a lamella as a connecting element 32 over the entire length of the FRC-plates 100 along the contact surface of the adjoining sides. Thanks to the FRC ridges 22, which also run in the transverse direction, and the glued-on connecting strips 32, ceilings can be built with any free span in both directions, although the individual FRC-plates 100 are usually limited in width in one direction (due to transport).

Figure 6B:
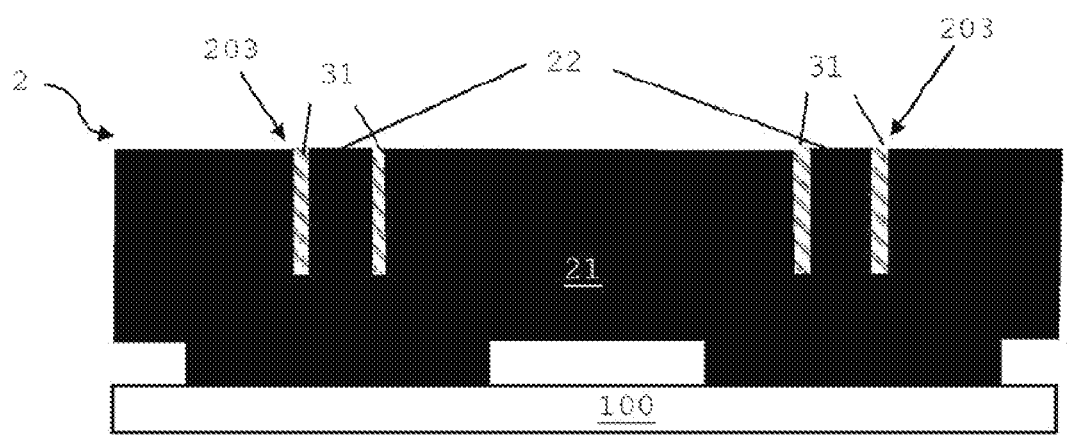
FIG. 6b a schematic side view of a ceiling element according to the present disclosure.
Figure 6C:
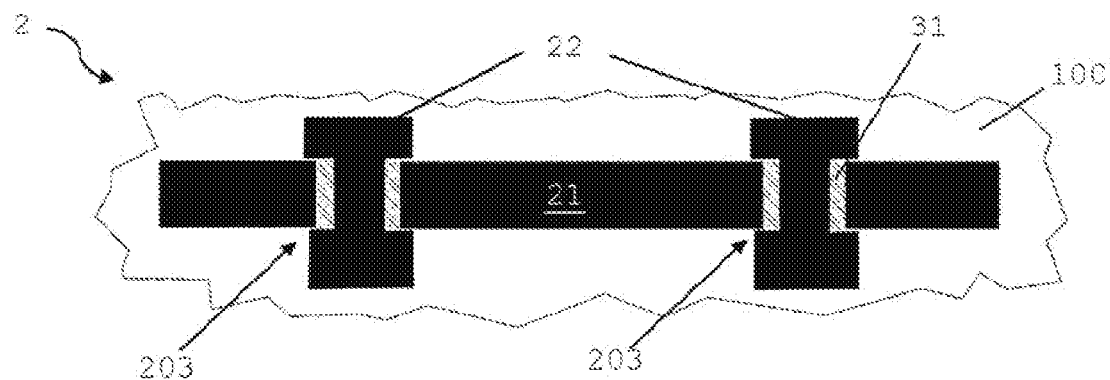
FIG. 6c a schematic top view of a concrete ceiling element according to the present disclosure.

FIG. 6b shows a schematic side view of a ceiling element 2 according to at least some embodiments, whereas FIG. 6c shows a schematic top view of this concrete ceiling element 2. A longitudinal FRC ridge 21 can be seen, which is arranged on an FRC-plate 100. Two transverse FRC ridges 22 can also be seen. In order to enable the transverse FRC ridges 22 to be plugged onto the longitudinal FRC ridge 21, the latter has an upwardly open groove 203 at the interfaces. The grooves 203 are made wider than the transverse FRC ridges 22 are wide. Accordingly, a cavity is created to the left and right of the transverse FRC ridges 22 at the interfaces, which cavity is at least partially filled with a filling material 31, such as mortar, in order to establish a connection between longitudinal and transverse ridges 21, 22 which can absorb tensile forces.

Figure 6D:
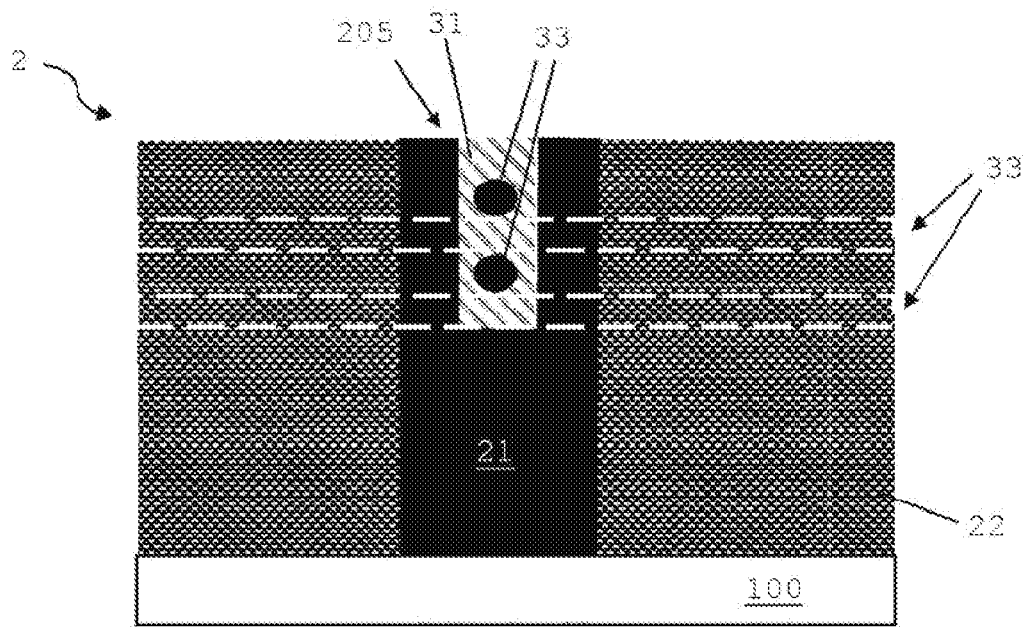
FIG. 6d a schematic section through a concrete ceiling element according to the present disclosure.

FIG. 6d shows a schematic section through a concrete ceiling element 2 according to at least some embodiments. More precisely, it is a cross section which goes through an FRC ridge, here a longitudinal FRC ridge 21, oriented in a first direction. Also to be seen is a section through one of the FRC ridges 22 running transversely to this longitudinal FRC ridge 21, which appears to be divided into two parts by the longitudinal FRC ridge 21. The FRC ridges 21, 22 are arranged on an FRC-plate 100. The longitudinal FRC ridge 21 has a cavity 205 into which two reinforcements 33 in the form of reinforcing rods are inserted and cast with a filling material 31. Such a design enables high tensile forces to be absorbed. Optionally, such reinforcements 33, as indicated here by dashed lines, can also run crosswise. In other words, not only the transverse FRC ridge 21 but also the longitudinal FRC ridge 22 has a cavity (not visible in this illustration) in which there are, for example, two reinforcing rods cast in a filling material (indicated by dashed lines). So that longitudinal and transverse reinforcements do not interfere with each other, they are preferably arranged in different levels.

Figure 7A:
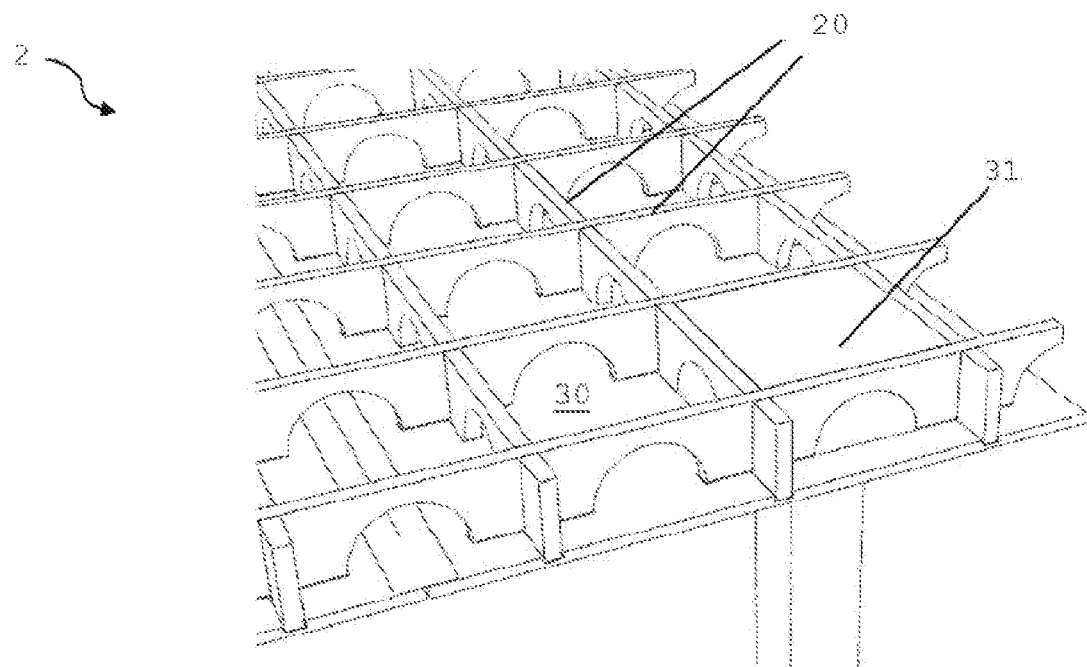
FIG. 7a a perspective top view of an embodiment of a concrete ceiling element according to the present disclosure with a space filled with binding agent.

FIG. 7a shows a perspective top view of an embodiment of a concrete ceiling element 2 according to at least some embodiments. The FRC ridges 20 are arranged in relation to one another in such a way that they form a type of cassette structure which has individual spaces 30 delimited by the FRC ridges 20. In order to enable the construction of further floors, the concrete ceiling to be formed on the concrete ceiling element 2 shown can be reinforced by, for example, filling individual spaces 30 with a binding agent 31, such as concrete, and thus forming punctual reinforcements.

Figure 7B:
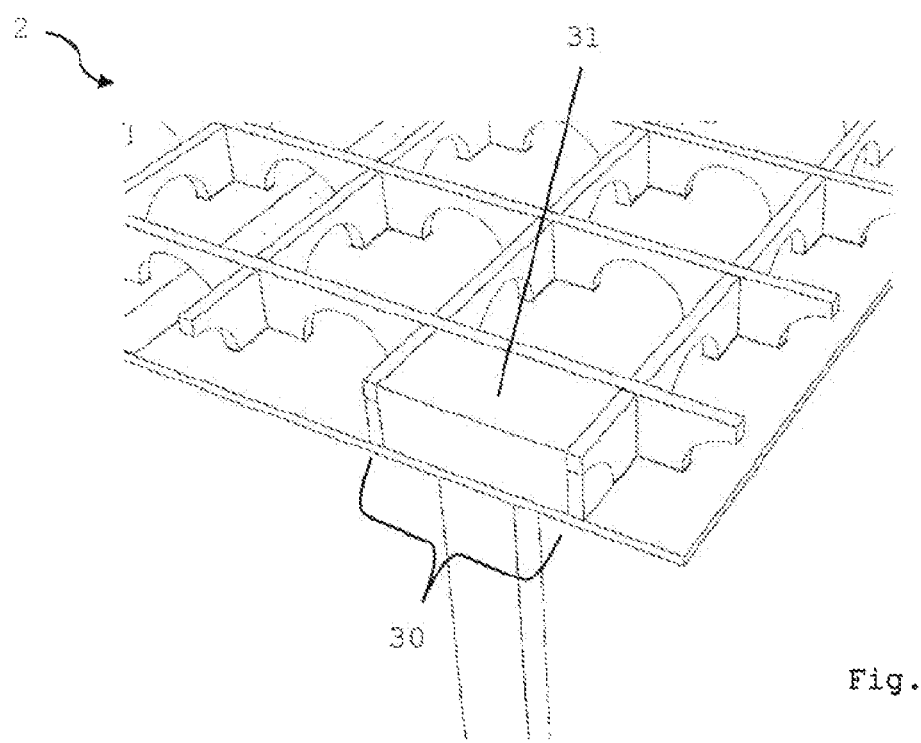
FIG. 7b a perspective top view of a further embodiment of a concrete ceiling element according to the present disclosure with a space filled with binding agent.

FIG. 7b shows a perspective top view of an embodiment of a concrete ceiling element 2 according to at least some embodiments, comparable to that shown in FIG. 7a. The punctual reinforcement by filling a space 30 with concrete 31 is cut here.

Figure 8:
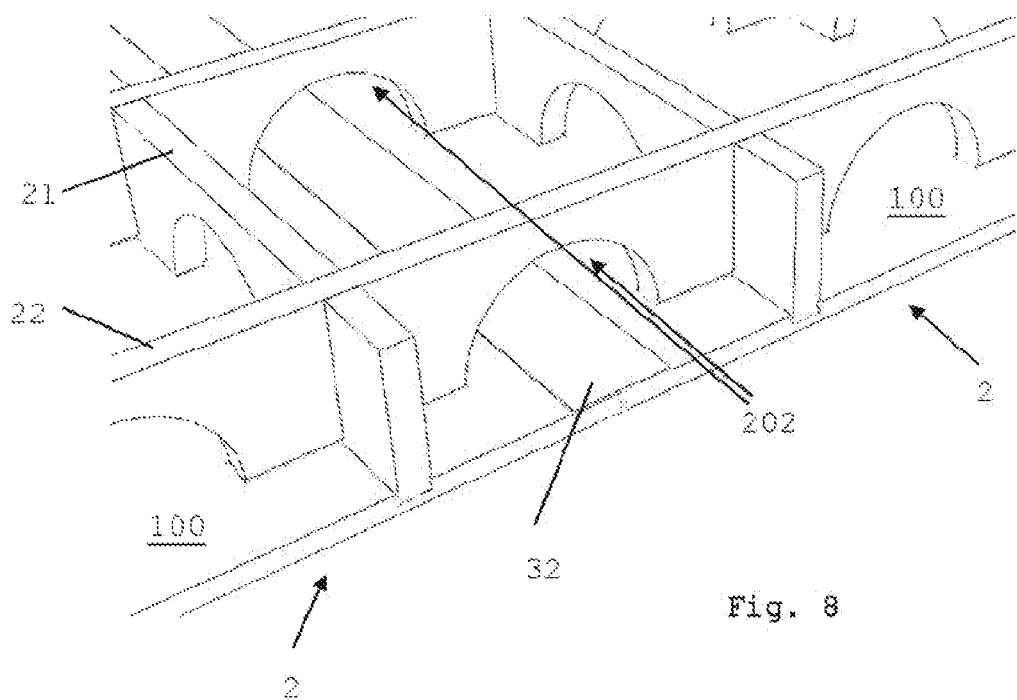
FIG. 8 a perspective top view of two interconnected concrete ceiling elements according to the present disclosure.

FIG. 8 shows a perspective top view of two interconnected concrete ceiling elements 2 according to at least some embodiments, the connection of which is achieved both by means of a connecting element 32 fixed by a binding agent and by gluing the mutually aligned sides of the adjacent FRC-plates 100 that are aligned with one another. The longitudinal FRC ridges 21 are oriented such that they run parallel to the contact surface of the adjoining sides of the FRC-plates 100, whereas the transverse FRC ridges 22 are oriented such that the contact surface of the adjoining sides of the FRC-plates 100 is spanned by one of the recesses 202. Correspondingly, the connecting element 32 is laid through the congruent, arc-shaped recesses 202 of the transverse FRC ridges 22 that form a row.

Figure 9:
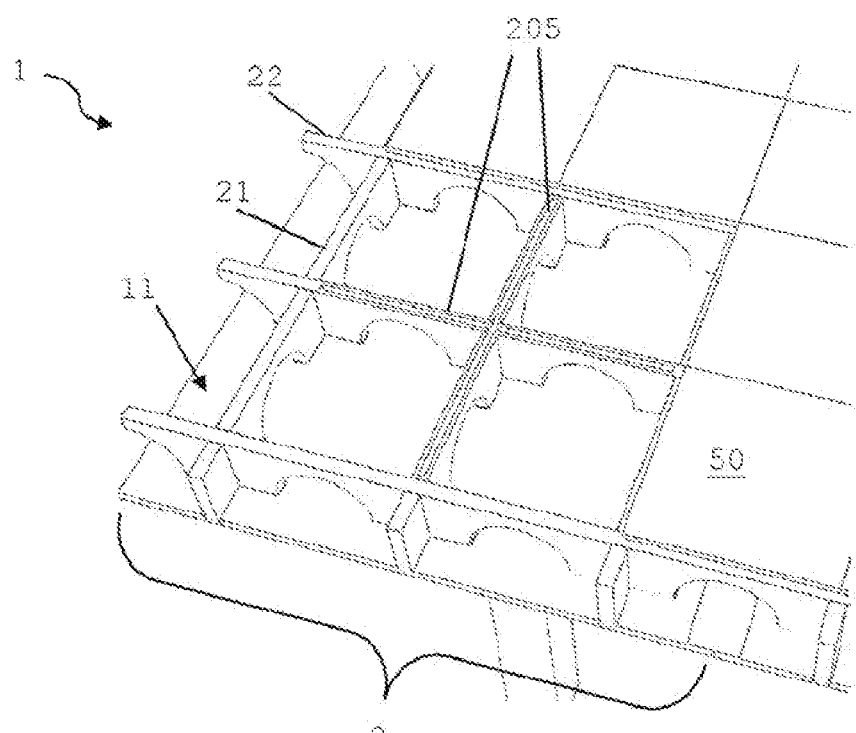
FIG. 9 a perspective top view of a concrete ceiling according to the present disclosure partially provided with a cover layer.

FIG. 9 shows a perspective top view of a concrete ceiling 1 according to at least some embodiments partially provided with a cover layer 50. From the surface 11 of the basic structure of the visible concrete ceiling element 2, longitudinal FRC ridges 21 and transverse FRC ridges 22 are arranged, some of which have a cavity 205 in the shape of a slot. The cavities 205 are open at the top, i.e. their opening points away from the upper side 11, so that tension elements (e.g. reinforcing iron, FRCK rods or the like) can be inserted from above and cast with a binding agent, such as mortar, in order to provide an additional reinforcement. The cavities 205 shown here are not (yet) filled with tension element and mortar. A covering layer 50 can be applied to the plane formed by the FRC ridges 21, 22 by, for example, parquet boards being supported on the FRC ridges 21, 22.

Figure 10A:
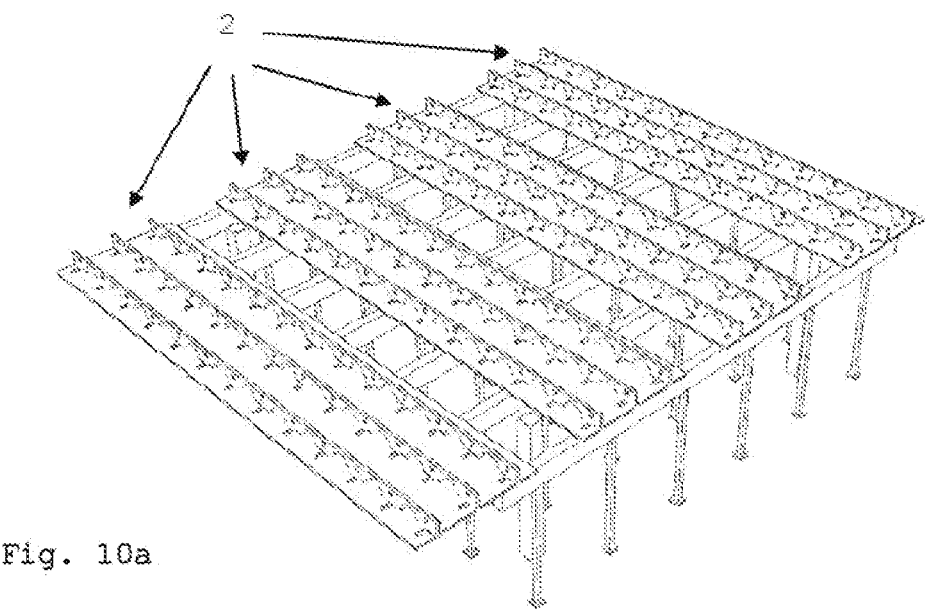
FIGS. 10a to 10e an embodiment of a method according to the present disclosure for producing a concrete ceiling.
Figure 10B:
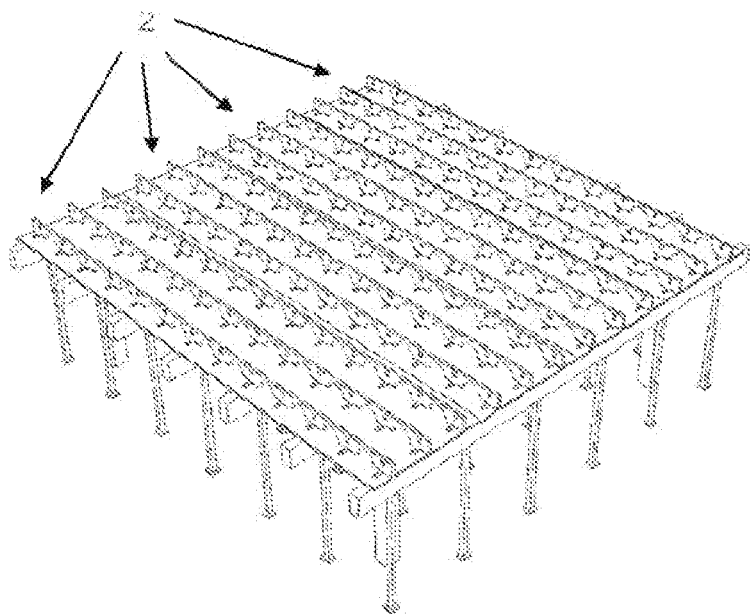
Figure 10C:
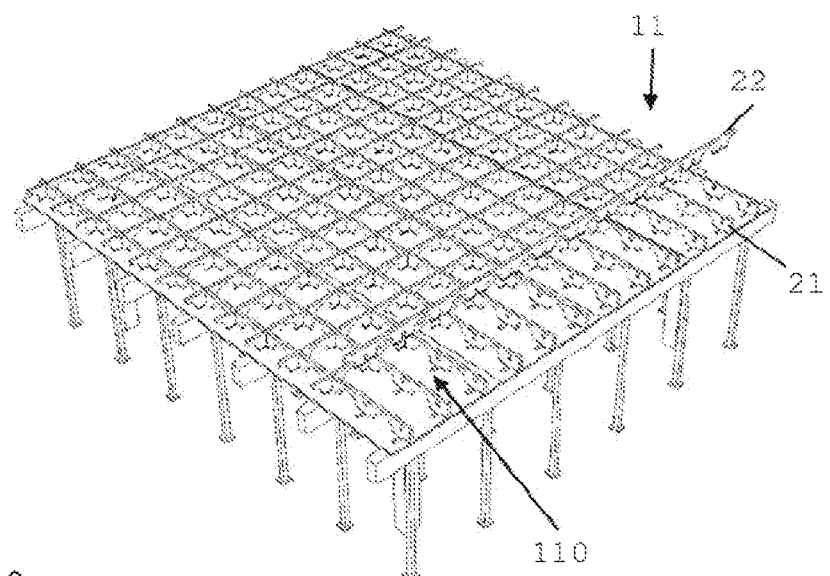
Figure 10D:
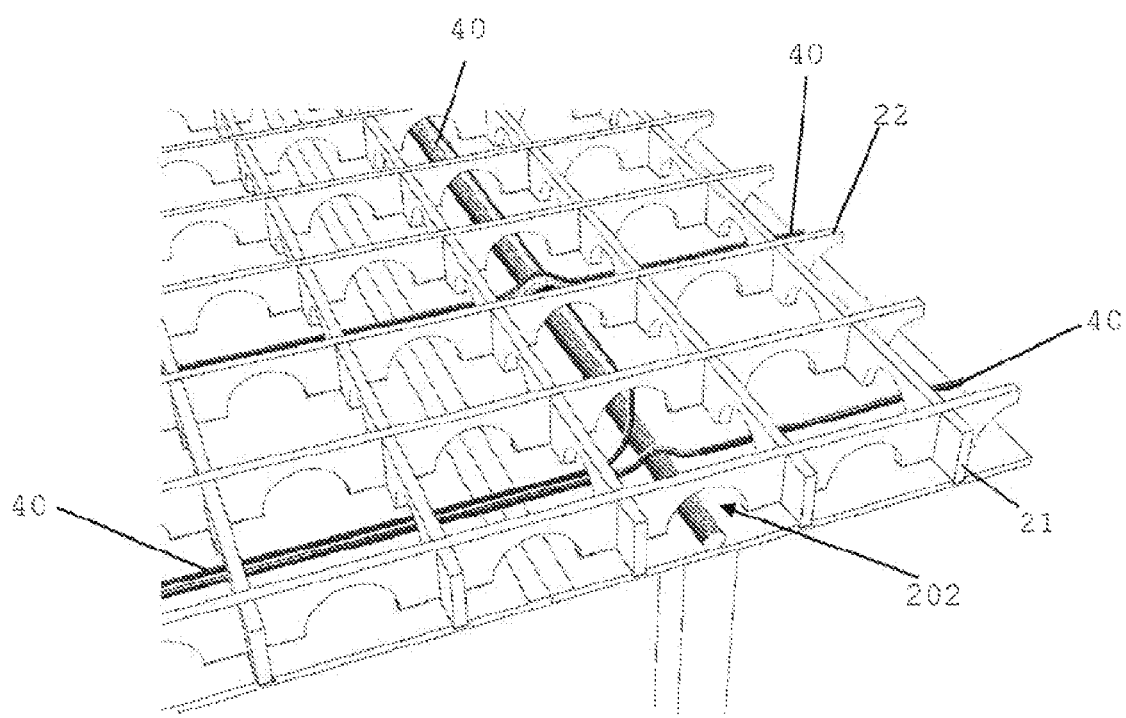
Figure 10E:
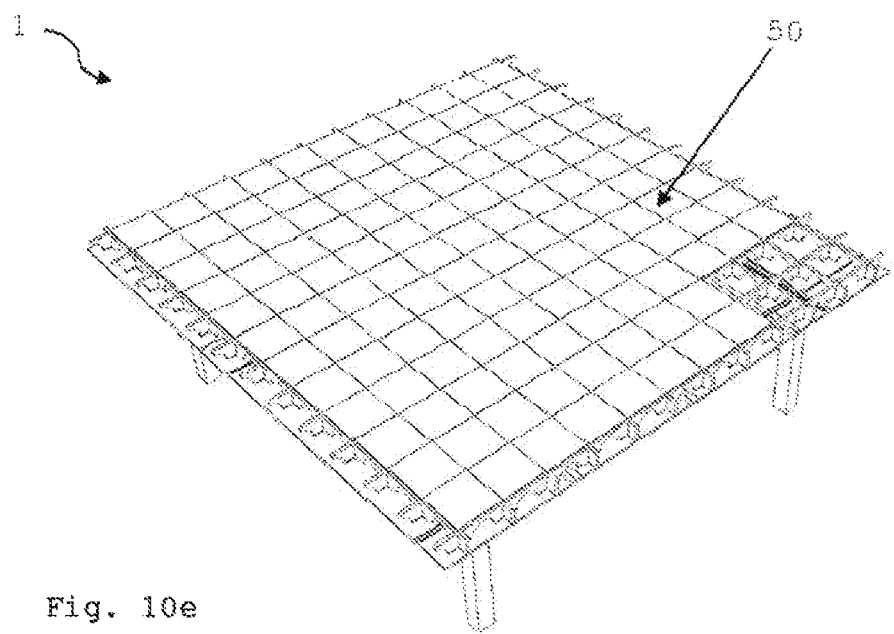

A method according to at least some embodiments for producing a concrete ceiling 1 is illustrated with the aid of the perspective top views shown in FIGS. 10a to 10e. In a first step shown in FIG. 10a, several concrete ceiling elements 2 (here four in number) are provided on a framework, for example formed by wooden struts and ceiling supports. These concrete ceiling elements 2 are then aligned with one another in a second step, as can be seen in FIG. 10b, in such a way that they form a large area (here a large rectangle) and are arranged flush with one another in all spatial directions. To fix the relative position of the individual concrete ceiling elements 2 to one another, they are then at least partially glued to one another (not shown). Since the provided concrete ceiling elements 2 were only provided with longitudinal FRC ridges 21, in a further step, as shown in FIG. 10c, transverse FRC ridges 22 are arranged on the upper side 11 in order to achieve reinforcement. The transverse FRC ridges 22 are, for example, plugged onto the already existing longitudinal ridges 21, e.g. by means of grooves which are present in the longitudinal FRC ridges 21 and transverse FRC ridges 22 and which are aligned with one another. In order to achieve a stronger connection than a pure plug connection, extensions located on the supports of the transverse FRC ridges 22 can be embedded in recesses 110 located on the upper side 11 of the basic structure and fixed therein by filling with a binding agent such as mortar. Then, as can be seen in FIG. 10e, the framework can be removed and the ceiling only rests on the definitive support points, here ceiling supports. However, this step can also be carried out later, e.g. after the lines 40 have been laid or even only after the cover layer 50 has been arranged. In the subsequent step illustrated with reference to FIG. 10d, which, however, can also be carried out before the step of attaching the transverse FRC ridges 22, various lines 40 are laid. These lines 40 are arranged on the upper side 11 of the basic structure 11 and passed through the recesses 202 of the FRC ridges 21, 22. Once at least some of the lines 40 have been laid, the application of the cover layer 50 and thus the completion of the production of the concrete ceiling 1 can begin.

Figure 11A:
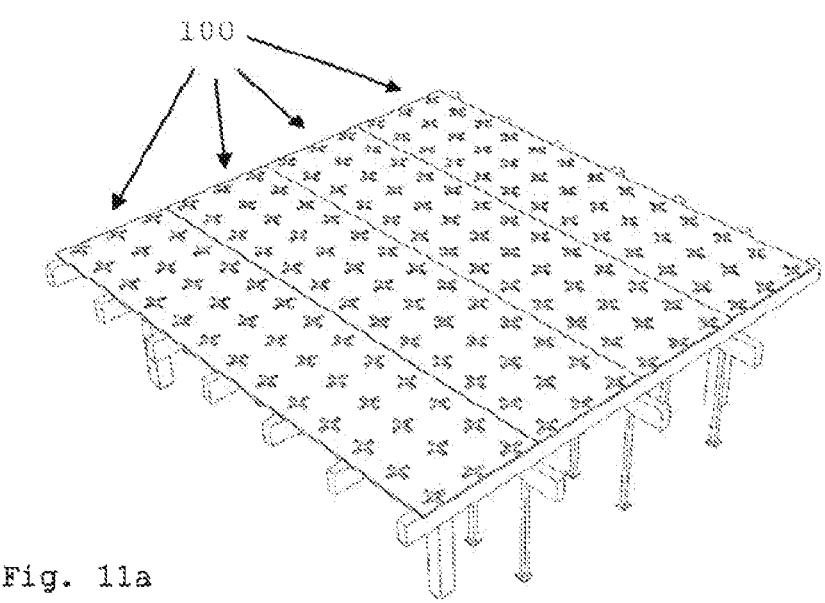
FIGS. 11a to 11e a further embodiment of a method according to the present disclosure for producing a concrete ceiling.
Figure 11B:
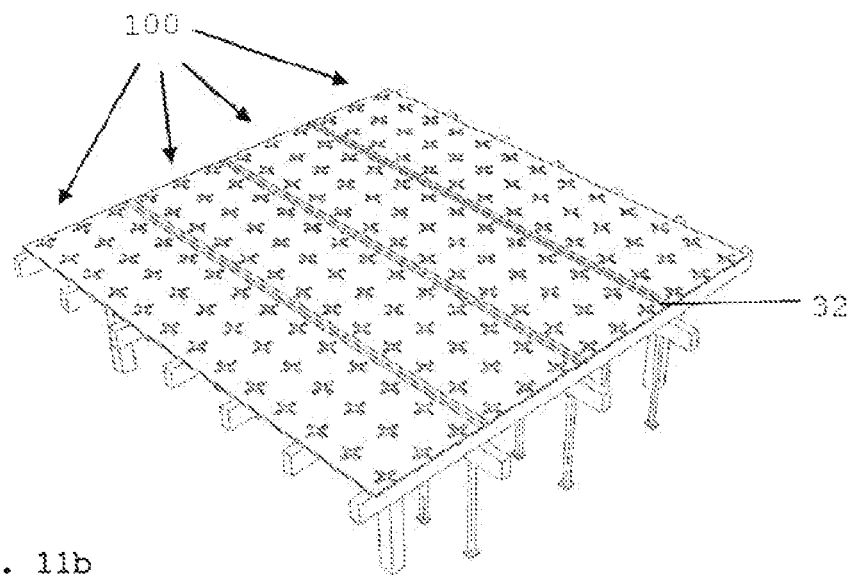
Figure 11C:
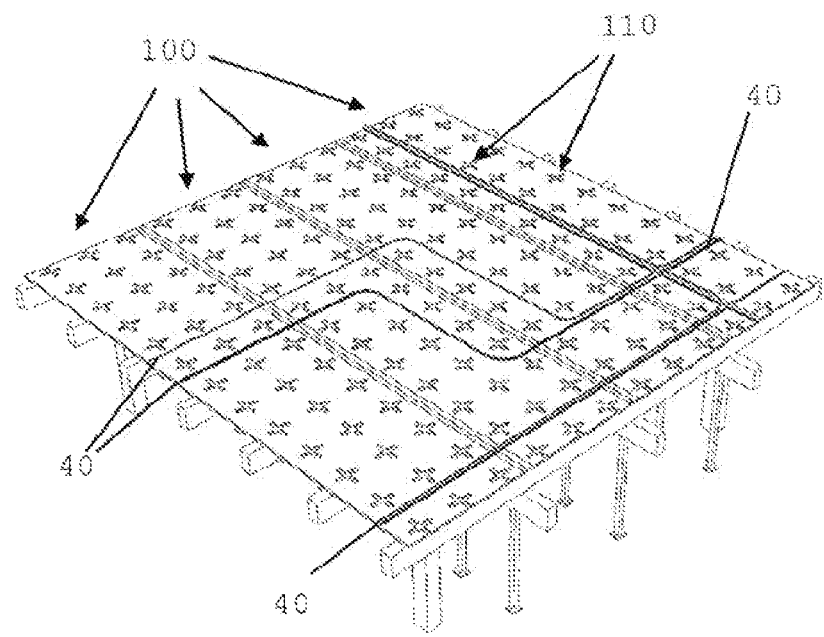
Figure 11D:
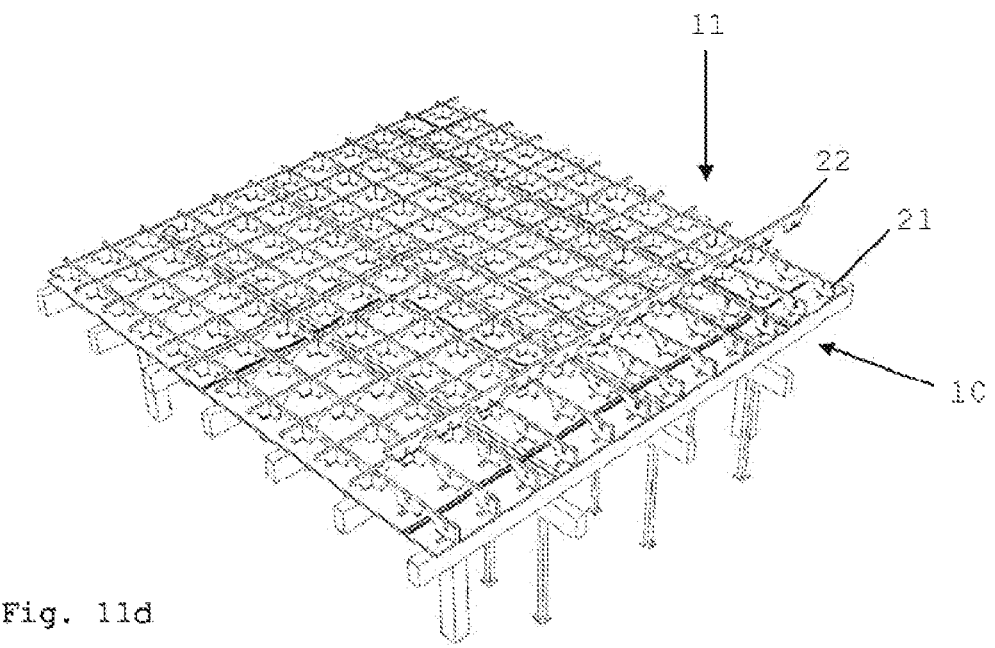
Figure 11E:
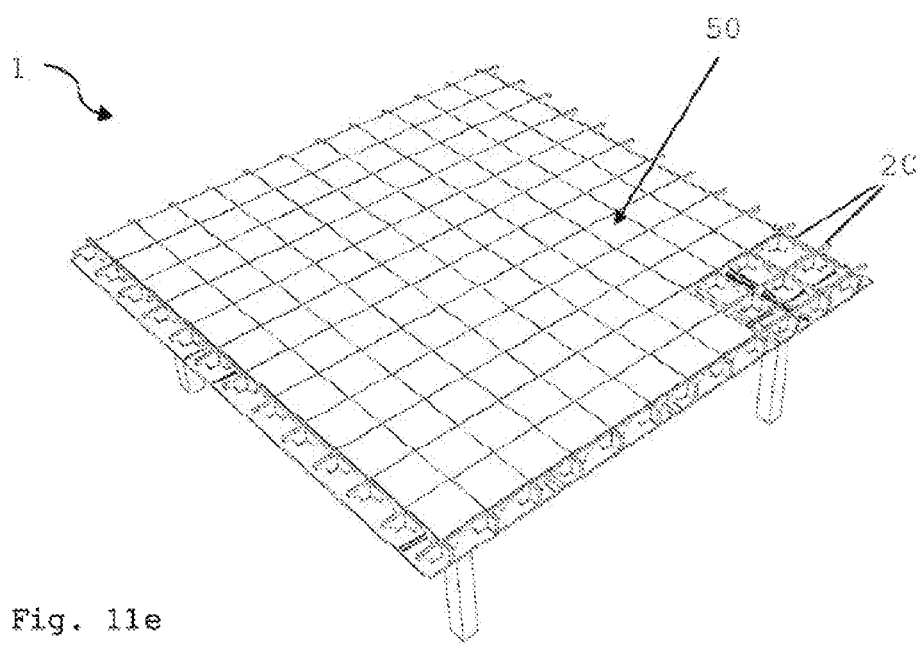

Another method according to at least some embodiments for producing a concrete ceiling 1 is illustrated with the aid of the perspective top views shown in FIGS. 11a to 11e. In a first step, at least one FRC-plate 100 is provided. If several FRC-plates 100 are provided (here there are four in number, as shown in FIG. 11a), these FRC-plates 100 are aligned flush with one another in such a way that a large (mostly rectangular) area is created. In order to connect the individual FRC-plates 100 to one another, they are glued along the contact surfaces of adjacent FRC-plates 100, as shown in FIG. 11b. For this purpose, on the one hand, a binding agent can be applied directly to the contact surfaces and, on the other hand, alternatively or additionally a connecting element 32, such as a lamella, can be glued to the upper side 11 along the contact surfaces of adjacent FRC-plates 100. In the next step shown in FIG. 11c, lines 40 are laid. If this step takes place before the FRC ridges are arranged, the lines 40 should be laid in such a way that they do not collide with the points that are intended for fastening the FRC ridges 20 to be arranged later. Such locations can be, for example, recesses 110 for receiving the supports of the FRC ridges 20. In the embodiment shown, these are regularly distributed over the individual FRC-plates 100 and are designed in the shape of a cross when viewed from above. The step shown in FIG. 11d, which can alternatively also be carried out before the laying of the lines 40, comprises the attachment of FRC ridges 20 on the upper side 11 of the basic structure 10 formed, among other things, by the FRC-plates 100. Ridges of one orientation (for example longitudinal FRC ridges 21) attached and then FRC ridges of a different orientation (for example transverse FRC ridges 22). In addition to known types of fastening, such as, for example, screwing, the FRC ridges 20 can be attached in particular by means of the plug-and-fit connection already described (see FIGS. 3a and 3b). It can be clearly seen that the cross-shaped arrangement of the FRC ridges 21, 22 gives the basic structure 10 sufficient stability so that only four carriers or supports, one per corner, are required to support the basic structure 10. The basic structure 10 would, however, also be sufficiently stable to only stand on three supports in the form of three carriers. The remaining roof supports can be removed (see FIG. 11e, in which the scaffolding is no longer present). In order to be able to reasonably attach crossing FRC ridges 21, 22, these preferably have interacting means which enable them to be plugged into one another or onto one another. Such means can be generally complementary shapes such as aligned grooves or complementary projections and recesses. In a last step shown in FIG. 11e, a cover layer 50 is then supported on the FRC ridges 20 in order to complete the production of the concrete ceiling 1.

Figure 12A:
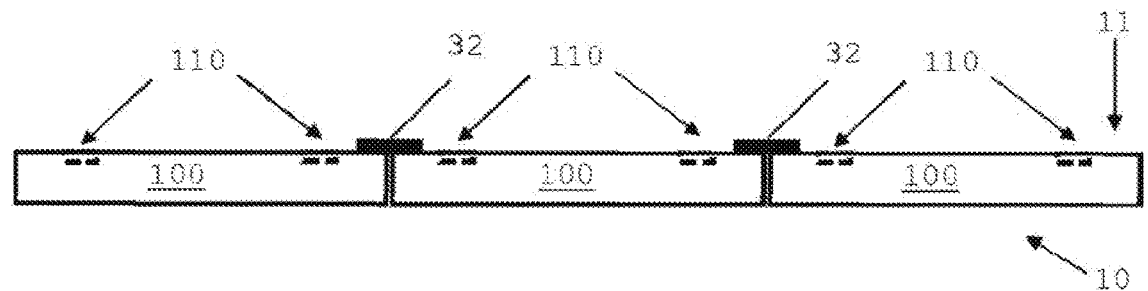
FIGS. 12a to 12c a further embodiment of a method according to the present disclosure for producing a concrete ceiling.
Figure 12B:
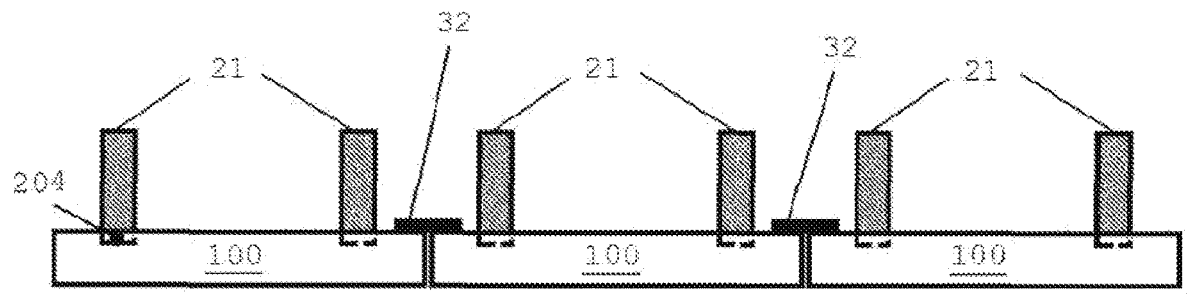
Figure 12C:
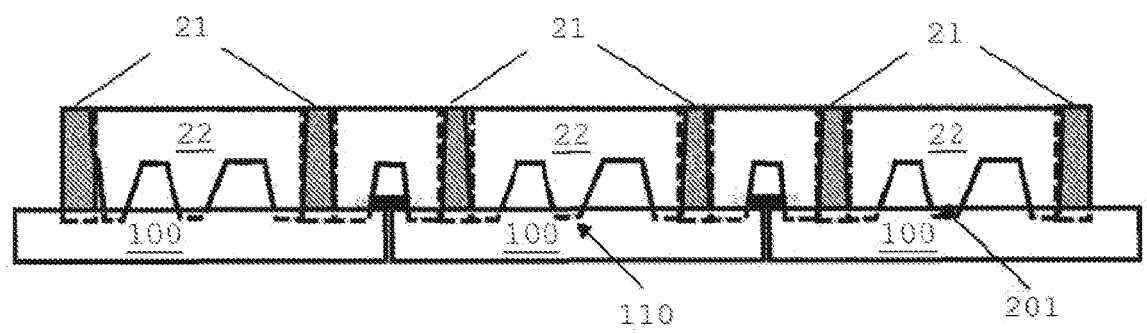

With the aid of FIGS. 12a to 12c, partial steps of an embodiment of a method according to at least some embodiments for producing a concrete ceiling, and thereby also the structure of a concrete ceiling element 2 according to at least some embodiments, are illustrated. FIG. 12a shows a basic structure 10 with upper side 11, which is composed of three FRC-plates 100 arranged next to one another. The FRC-plates 100 are connected to one another via connecting elements 32 attached to the upper side 11. The FRC-plates 100 have recesses 110 for the receiving of supports or the extension, respectively the extensions of the supports of FRC ridges. Since this is a side view and the recesses 110 in this embodiment do not extend through the entire length of the FRC-plates 100 (which may well be the case in other embodiments), these are only shown in dashed lines to clarify their offset in the plane of the drawing. After connecting the individual FRC-plates 110 to one another, two longitudinal FRC ridges 21 per FRC-plate 100 are arranged, preferably by means of a plug-and-fit connection with the aid of the indicated recesses 110 and the extensions 201 of the supports of the FRC ridges 21. For the sake of clarity, only one extension 204 is provided with a reference number. The extensions 201 are also shown in dashed lines, since they are mapped into the image plane. In order to now arrange the transverse FRC ridges 22, these can be inserted in individual fragments between the already existing longitudinal FRC ridges 21. The fragments are held in place, for example, by gluing them to the adjacent longitudinal FRC ridges 21, for example with the aid of a filling material or binding agent, such as mortar or the like. However, the fragments can, for example, also have a conical shape at the end, i.e. pointing in the direction of the adjoining longitudinal FRC ridges 21, and can thus be properly clamped between the longitudinal FRC ridges 21. The conical shape is shown, for example, in the transverse FRC ridge 22 on the left in the figure. Here, a gap remains in the lower area near the upper side 11, which, although it could be filled with a filling material, can just as easily remain free. Furthermore, the fragments of the transverse FRC ridges 22 are arranged over their supports or the extensions 201 of these supports, preferably by means of plug-and-fit connections on the FRC-plates 100. For the sake of clarity, only one extension 204 is provided with a reference number. The recesses 110 in which they are inserted are not shown in FIGS. 12a and 12b and are only once provided with a reference number in FIG. 12c.

Figure 13A:
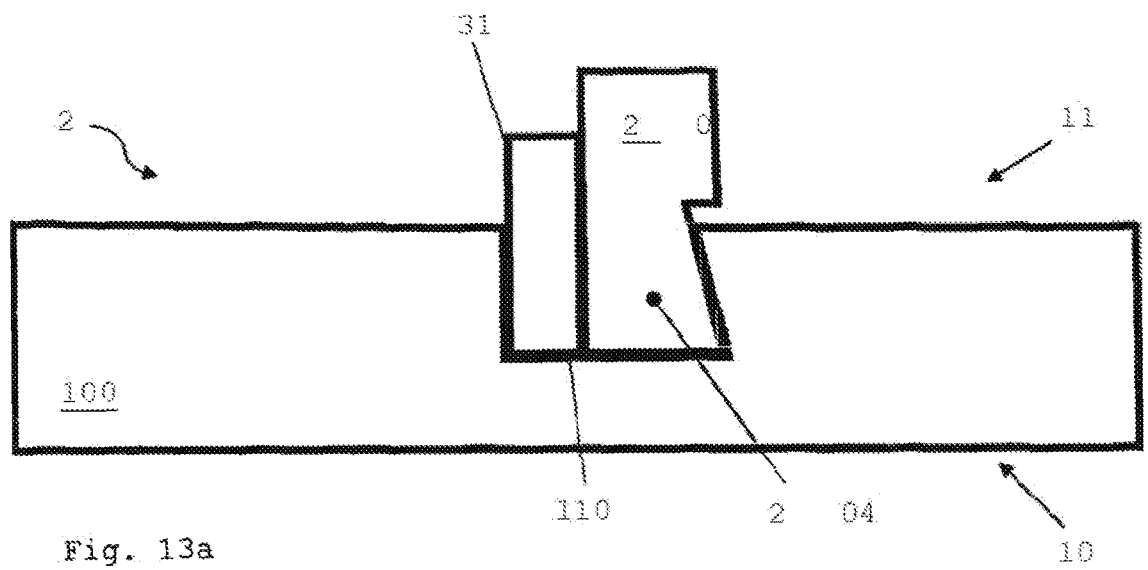
FIGS. 13a to 13c schematic sections through embodiments of concrete ceiling elements according to the present disclosure having a plug-and-fit connection.
Figure 13B:
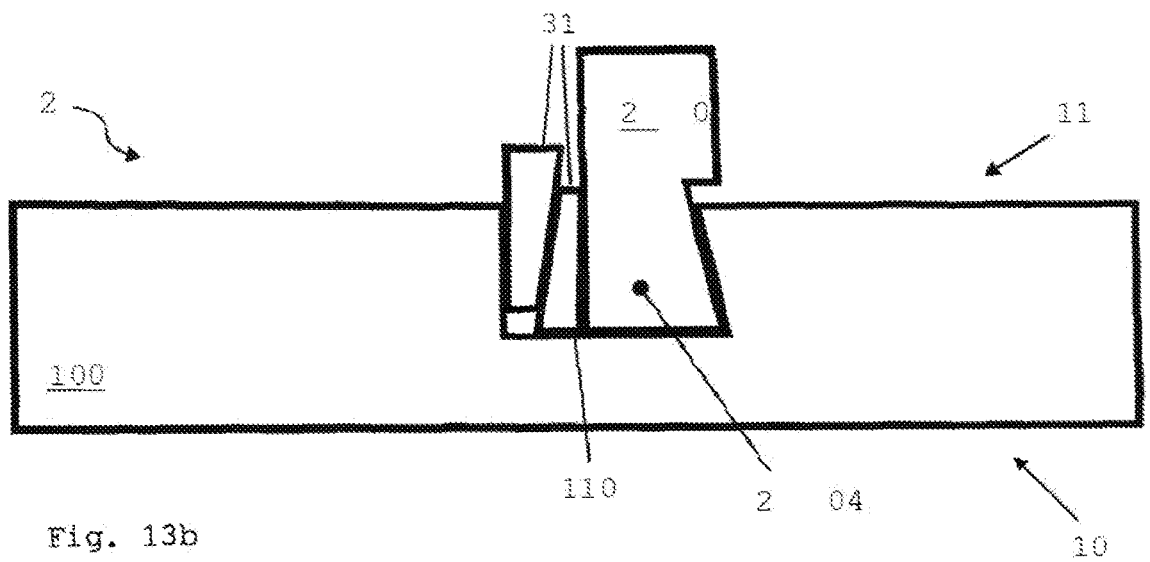
Figure 13C:
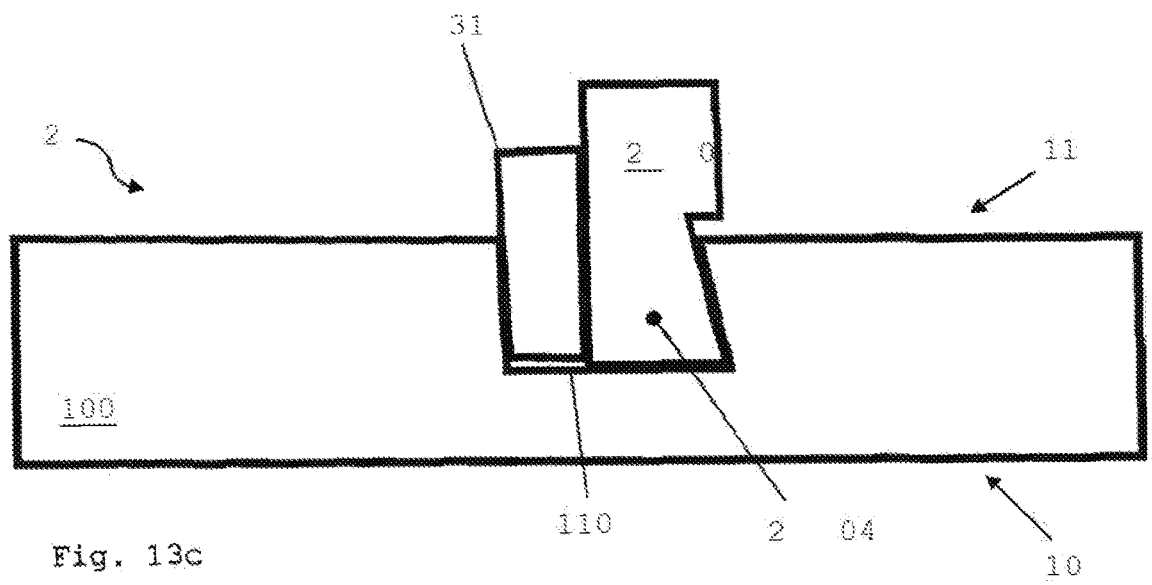

In FIGS. 13a to 13c, various variants of the plug-and-fit connection are shown on the basis of sections through concrete ceiling elements 2 according to at least some embodiments. The plug-and-fit connection is used to connect an FRC ridge 20 in sections to the basic structure 10. The basic structure 10 has an upper side 11 and comprises at least one FRC-plate 100. The FRC-plate 100 in turn has at least one recess 110 which, in the examples shown here, has a wedge shape in cross section and is open towards the upper side 11. The extension 204 of a support of the FRC element 20, likewise wedge-shaped in cross section, protrudes into the recess 110. The size of the recess 110 is selected so that the extension 204 can be introduced into it from the upper side 11. In order to obtain a non-positive connection, the extension 204 is fixed in the recess 110, with the help of a filling material 31. In addition to agents such as mortar, sand, etc., a simple plate with a rectangular cross section (see FIG. 13a), for example, a wedge (see FIG. 13c) or two preferably oppositely aligned wedges (see FIG. 13b) can be used to clamp the extension 204 in the recess 110 and thus connect the FRC ridge 20 to the basic structure 10.

REFERENCE SIGNS LIST

0 Concrete ceiling, known
1 Concrete ceiling
2 Concrete ceiling element
10 Basic structure
11 Upper side
20 FRC-ridge
201 Support FRC-ridge
202 Recess FRC-ridge
203 Groove FRC-ridge
204 Extension of support FRC-ridge
205 Cavity
21 Longitudinal FRC-ridge
22 Transversal FRC-ridge
25 Area wide arrangement
26 Area narrow arrangement
30 Space
31 Filling material
32 Connecting element
33 Reinforcement
40 Line
50 Covering layer
100 FRC-plate
110 Recess While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

The invention claimed is:

1. A concrete ceiling element comprising:
a flat basic structure with an upper side and comprising a FRC-plate; and
a FRC ridge,
wherein the FRC ridge is arranged on the upper side and connected in sections to the basic structure,
wherein the FRC ridge has at least two supports which provide the connection to the basic structure in the sections, and
wherein:
at least one of the at least two supports at an end thereof and facing the upper side has at least one extension, which extension is arranged in a recess of the FRC-plate of the basic structure and is fixed in the recess which is dimensioned larger than the extension; or
the FRC-plate of the basic structure has at least one extension on the upper side thereof, which extension is arranged in a recess at an end of at least one of the at least two supports of the FRC ridge and is fixed in this recess which is dimensioned larger than the extension.

2. The concrete ceiling element according to claim 1, wherein a recess is located between the at least two supports.

3. The concrete ceiling element according to claim 1 wherein there are at least two FRC ridges, the at least two FRC ridges arranged parallel to one another.

4. The concrete ceiling element according to claim 3, wherein at least some of the at least two FRC ridges arranged parallel to one another are arranged equidistant from one another.

5. The concrete ceiling element according to claim 3, wherein at least some of the at least two FRC ridges arranged parallel to one another are not equidistant from one another.

6. The concrete ceiling element according to claim 1, comprising at least two FRC ridges, wherein the at least two FRC ridges are arranged at an angle of less than 180° and greater than 0° to one another, wherein the at least two FRC ridges intersect at a point of intersection, and wherein the at least two FRC ridges are plugged into each other at the point of intersection.

7. The concrete ceiling element according to claim 6, wherein the at least two FRC ridges each have a groove at the point of intersection.

8. The concrete ceiling element according to claim 3, wherein there are at least three FRC ridges, wherein the at least three FRC ridges are arranged to one another in such a way that they enclose a space that is at least partially poured out with concrete.

9. The concrete ceiling element according to claim 1, wherein the FRC ridge is solidly formed or the FRC ridge has at least one cavity.

10. The concrete ceiling element according to claim 9, wherein, when the FRC ridge has a least one cavity, the at least one cavity is provided with a tension element.

11. The concrete ceiling element according to claim 1, wherein the flat basic structure comprises at least two FRC-plates which are arranged planar next to one another and are adjacent to one another.

12. The concrete ceiling element according to claim 11, wherein the at least two FRC-plates are at least partially glued along mutually aligned sides.

13. The concrete ceiling element according to claim 11, wherein at least one connecting element is at least partially mounted on the upper side of the flat basic structure along mutually aligned sides of the at least two FRC-plates.

14. The concrete ceiling element according to claim 1, wherein the at least one extension and the recess have the shape of a wedge in cross section.

15. The concrete ceiling element according to claim 1, wherein a dimension of a narrowest point of the recess is larger than a dimension of a widest point of the at least one extension.

16. The concrete ceiling element according to claim 1, wherein both the extension and the recess have the shape of a wedge with only one inclined plane in cross section.

17. The concrete ceiling element according to claim 3, wherein the at least two FRC ridges are orthogonal to one another.

18. The concrete ceiling element according to claim 5, wherein the at least two FRC ridges each have an opposing groove at a point of intersection and a depth of each opposing groove in total corresponds to at least a height of the at least two FRC ridges at the point of intersection.

19. The concrete ceiling element according to claim 8, wherein at least one of the at least three FRC ridges has at least one cavity in the form of a slot.

20. The concrete ceiling element according to claim 19, wherein the at least one cavity is provided with a tension rod.

21. The concrete ceiling element according to claim 19, wherein the at least one cavity is provided with a tension element and is at least partially filled with a filling material.

22. The concrete ceiling element according to claim 19, wherein the at least one cavity is provided with a tension element, is at least partially filled with a filling material and wherein the filling material is mortar.

23. The concrete ceiling element according to claim 11, wherein at least one connecting patch is at least partially mounted on the upper side along mutually aligned sides of the at least two FRC-plates.

24. The concrete ceiling element according to claim 1, wherein the at least one extension and the recess each have a shape of a wedge in cross section with at least one inclined planes.

25. The concrete ceiling element according to claim 1, wherein a dimension of the recess is larger at a narrowest point thereof than a dimension of the at least one extension at a widest point thereof.

26. The concrete ceiling according to claim 15, comprising a cover layer supported on the FRC ridge, wherein the cover layer comprises floor slabs made of one of: wood, stone, FRC-concrete or a combination thereof.

27. The concrete ceiling element according to claim 1, wherein the at least one extension and the recess are not dimensioned for a form fit, and the at least one extension is fitted into the recess by a filling material so that a non-positive connection of the plug-and-fit connection is only obtained by means of the filling material.

28. A concrete ceiling comprising at least one concrete ceiling element according to claim 1.

29. The concrete ceiling according to claim 28, comprising at least one line which is arranged on the upper side of the basic structure and which is arranged to pass through at least one recess of the FRC ridge.

30. The concrete ceiling according to claim 28, comprising a cover layer supported on the FRC ridge.

31. A method for producing a concrete ceiling, comprising the steps:
providing at least one concrete ceiling element according to claim 1; and at least one of:
arranging at least one line on the upper side of the basic structure and guiding this line through at least one recess of the FRC ridge; and
supporting a cover layer on the FRC ridge.

32. The method for producing a concrete ceiling according to claim 31, comprising:
providing at least two of the concrete ceiling elements according to claim 1; and
arranging the at least two concrete ceiling elements flat next to one another; and at least one of:
gluing the at least two concrete ceiling elements at least partially along mutually aligned sides of the ceiling elements; and
attaching at least one connecting element on the upper side of each adjacent respective FRC-plate at least partially along the mutually aligned sides of the flat adjacent and mutually adjacent concrete ceiling elements.

33. The method for producing a concrete ceiling according to claim 31, comprising:
arranging an additional FRC ridge on the upper side of the basic structure.

34. The method for producing a concrete ceiling according to claim 32, wherein the at least two concrete ceiling elements are arranged adjacent to one another.

35. The method for producing a concrete ceiling according to claim 33, wherein the additional FRC ridge on the upper side of the basic structure is arranged at an angle of less than 180° and greater than 0° relative to the FRC ridge.

36. The method for producing a concrete ceiling according to claim 33, further comprising the step of plugging the additional FRC ridge onto the FRC ridge by means of opposing grooves.

37. A method for producing a concrete ceiling element according to claim 1, comprising:
providing the FRC-plate for forming a basic structure;
arranging the FRC ridge on the upper side of the basic structure, by either:
introducing the at least one extension of the at least one of the at least two supports of the FRC ridge into the recess of the FRC-plate, or
introducing the at least one extension of the FRC-plate into the recess at the end of at least one of the of the at least two supports of the FRC ridge.

38. The method for producing a concrete ceiling element according to claim 37, wherein the FRC-plate has recesses that are wedge-shaped in cross-section.

39. The method for producing a concrete ceiling element according to claim 37, wherein the at least one extension of the at least one of the at least two supports of the FRC ridge has a wedge-shaped cross section.

40. The method for producing a concrete ceiling element according to claim 37, wherein the at least one extension of the at least one of the at least two supports of the FRC ridge is fixed in the recess with the aid of a filling material.

41. The method for producing a concrete ceiling element according to claim 37, wherein the method further comprises arranging a further FRC ridge on the upper side of the basic structure.

42. The method for producing a concrete ceiling element according to claim 41, wherein the at least one further FRC ridge on the upper side of the basic structure is arranged at an angle of less than 180° and greater than 0° to the FRC ridge.

43. The method for producing a concrete ceiling element according to claim 41, wherein the method comprises plugging the further FRC ridge onto the FRC ridge by means of opposing grooves.

44. A method for connecting two FRC concrete elements comprising the steps of:

providing a plug-and-fit connection; and
connecting the two FRC concrete elements with the plug-and-fit connection, wherein the plug-and-fit connection consists of an extension of one of the at least two FRC concrete elements that is inserted into a recess in another of the at least two FRC concrete elements, and a filling material, wherein the recess is dimensioned larger than the extension and the extension and recess are not dimensioned for a form fit, and wherein the extension is fitted into the recess by the filling material so that a non-positive connection of the plug-and-fit connection is only obtained by means of the filling material.

45. A method for producing a concrete ceiling, comprising:
providing a FRC-plate having an upper side for forming a basic structure, wherein the FRC-plate has a recess on the upper side;
arranging a FRC ridge having at least two supports on the upper side of the basic structure by introducing an extension of one of the at least two supports of the FRC ridge into the recess of the at least one FRC-plate, wherein the recess is dimensioned larger than the extension, and fixing the extension in the recess with the aid of a filling material; and
supporting a cover layer on the FRC ridge.

46. The method for producing a concrete ceiling according to claim 45, comprising:
arranging at least one further FRC ridge on the upper side of the basic structure.

47. The method for producing a concrete ceiling according to claim 45, comprising:
providing at least one additional FRC-plate for forming a basic structure; and
arranging the FRC-plate and the additional FRC-plate flat next to one another.

48. The method for producing a concrete ceiling according to claim 45, wherein the recess has a wedge-shaped cross section.

49. The method for producing a concrete ceiling according to claim 45, further comprising the step of arranging at least one line on the upper side of the basic structure after the step of providing the FRC-plate for forming the basic structure.

50. The method for producing a concrete ceiling according to claim 45, wherein the extension of one of the at least two supports of the FRC ridge has a wedge-shaped cross section.

51. The method for producing a concrete ceiling according to claim 46, wherein the at least one further FRC ridge on the upper side of the basic structure is arranged at an angle of less than 180° and greater than 0° to the FRC ridge.

52. The method for producing a concrete ceiling according to claim 46, further comprising the step of plugging the at least one further FRC ridge onto the FRC ridge by means of opposing grooves.

53. The method for producing a concrete ceiling according to claim 47, wherein the FRC-plate and the additional FRC-plate each has recesses that are wedge-shaped in cross-section.

54. The method for producing a concrete ceiling according to claim 47, wherein the method further comprises at least one of:
gluing the FRC-plate and the additional FRC-plate at least partially along mutually aligned sides thereof; and
attaching at least one connecting element on the upper side at least partially along mutually aligned sides of the FRC-plate and the additional FRC-plate which are arranged next to one another and adjacent to one another.

* * * * *